(12) United States Patent
Zhang et al.

(10) Patent No.: US 10,591,789 B2
(45) Date of Patent: Mar. 17, 2020

(54) CONNECTOR, DISPLAY SCREEN AND METHOD FOR MANUFACTURING THE DISPLAY SCREEN

(71) Applicants: BOE Technology Group Co., Ltd., Beijing (CN); Chengdu BOE Optoelectronics Technology Co., Ltd., Chengdu (CN)

(72) Inventors: Yu Zhang, Beijing (CN); Jian He, Beijing (CN); Chuan Peng, Beijing (CN); Yan Cui, Beijing (CN); Chunhui Zhu, Beijing (CN)

(73) Assignees: BOE Technology Group Co., Ltd, Beijing (CN); Chengdu BOE Optoelectronics Technology Co., Ltd., Sichuan (CN)

( * ) Notice: Subject to any disclaimer, the term of this patent is extended or adjusted under 35 U.S.C. 154(b) by 0 days.

(21) Appl. No.: 16/108,139

(22) Filed: Aug. 22, 2018

(65) Prior Publication Data
US 2019/0107748 A1    Apr. 11, 2019

(30) Foreign Application Priority Data

Oct. 10, 2017    (CN) .......................... 2017 1 0936247

(51) Int. Cl.
*H01R 12/70*    (2011.01)
*G02F 1/13*    (2006.01)
*G02F 1/1345*    (2006.01)

(52) U.S. Cl.
CPC ..... *G02F 1/13452* (2013.01); *H01R 12/7076* (2013.01)

(58) Field of Classification Search
CPC ........................ G02F 1/13452; H01R 12/7076
See application file for complete search history.

(56) References Cited

U.S. PATENT DOCUMENTS

| 2014/0042406 A1 | 2/2014 | Degner et al. |
| 2014/0138637 A1 | 5/2014 | Yang et al. |
| 2015/0048320 A1 | 2/2015 | Lee et al. |

(Continued)

FOREIGN PATENT DOCUMENTS

| CN | 104377166 A | 2/2015 |
| CN | 104429382 A | 3/2015 |

(Continued)

OTHER PUBLICATIONS

First office action of Chinese application No. 201710936247.8 dated Dec. 3, 2019.

*Primary Examiner* — Hoa C Nguyen
(74) *Attorney, Agent, or Firm* — Fay Sharpe LLP

(57) ABSTRACT

A connector, a display screen and a method for manufacturing the display screen are provided. The connector includes a substrate, and a conductor structure arranged on the substrate. One end of the conductor structure is connected to a data signal line on a display panel, and the other end of the conductor structure is connected to a driver integrated circuit IC arranged on a non-display side of the display panel. A target surface, away from the substrate, of the conductor structure is uneven. The connector reduces the probability of the conductor structure breaking under the stress of the substrate, thereby guaranteeing the good display effect of the display screen.

13 Claims, 46 Drawing Sheets

(56) References Cited

U.S. PATENT DOCUMENTS

2016/0066409 A1* 3/2016 Kwon .................... H05K 1/028
                                                        174/254
2016/0079281 A1   3/2016 Park et al.
2017/0277288 A1* 9/2017 Choi ....................... G06F 3/041
2017/0288007 A1* 10/2017 Shin ........................ H01L 51/56

FOREIGN PATENT DOCUMENTS

| CN | 104521331 A | 4/2015 |
| CN | 104733471 A | 6/2015 |
| CN | 104769719 A | 7/2015 |
| CN | 205376529 U | 7/2016 |
| EP | 2889866 A2 | 7/2015 |

* cited by examiner

CONNECTOR, DISPLAY SCREEN AND METHOD FOR MANUFACTURING THE DISPLAY SCREEN

This application claims priority to Chinese Patent Application No. 201710936247.8, filed with the State Intellectual Property Office on Oct. 10, 2017, the entire contents of which are incorporated herein by reference.

TECHNICAL FIELD

The present disclosure relates to a connector, a display screen and a method for manufacturing the display screen.

BACKGROUND

With the popularization of smart devices and the users' demand for increased screen-to-body ratios of the smart devices, frames of display screens in the smart devices are becoming narrower. The screen-to-body ratio refers to a ratio of an area of a display region of a display screen to a total area of a front surface of the display screen.

SUMMARY

There are provided in the present disclosure a connector, a display screen and a method for manufacturing the display screen.

In an aspect, there is provided a connector, comprising: a substrate, and a conductor structure arranged on the substrate, wherein one end of the conductor structure is connected to a data signal line on a display panel, and the other end of the conductor structure is connected to a driver integrated circuit IC arranged on a non-display side of the display panel; a target surface, away from the substrate, of the conductor structure is uneven.

Optionally, the substrate comprises a target region, and a first edge region and a second edge region which are located on two sides of the target region respectively, wherein a portion, located on the target region, in the target surface is uneven, and portions, located on the first edge region and the second edge region, in the target region are even.

Optionally, the substrate comprises a target region, and a first edge region and a second edge region which are located on two sides of the target region respectively, wherein portions, located on the target region, the first edge region and the second edge region, in the target surface are uneven.

Optionally, the target region of the substrate is provided with a groove whose opening faces the conductor structure.

Optionally, the conductor structure comprises m conductive layers arranged on the substrate on which n target insulating layers are also arranged, where $m \geq 2$, $n \geq 1$; the m conductive layers comprise a data conductor layer and a circuit conductor layer, wherein the data conductor layer is connected to the data signal line, and the circuit conductor layer is connected to the driver IC; the n target insulating layers are located among the m conductor layers, and the m conductor layers are connected through via holes in the n target insulating layers.

Optionally, at least one of the target insulating layers is arranged between every two adjacent conductor layers in the m conductor layers.

Optionally, $m=2$, $n=2$; two target insulating layers are stacked between two conductor layers; the data conductor layer is the second conductor layer close to the substrate; the circuit conductor layer is any one of the two second conductor layers.

Optionally, $m=3$, $n=2$; the target insulating layers and the conductor layers are alternately arranged; the data conductor layer is the third conductor layer close to the substrate; the circuit conductor layer is any one of the three conductor layers.

Optionally, $m=2$, $n=1$; one target insulating layer is arranged between two conductor layers; the data conductor layer is the second conductor layer close to the substrate; the circuit conductor layer is any one of the two conductor layers.

Optionally, the substrate comprises: a polyimide PI base, and a water blocking layer, a buffer layer and an auxiliary insulating layer which are stacked on the PI base in sequence.

In another aspect, there is provided a display screen, comprising: a display panel, a driver IC and a connector, wherein the driver IC is arranged on a non-display side of the display panel, and the connector is configured to connect the display panel and the driver IC.

Optionally, the display panel comprises: a substrate base, and an active layer, a first gate insulating layer, a first gate signal line, a second gate insulating layer, a second gate signal line, an interlayer dielectric layer and a data signal line which are arranged on the substrate base in sequence; the connector comprises a substrate on which two conductor layers and two target insulating layers are arranged, the two target insulating layers being stacked between the two conductor layers; the first conductor layer close to the substrate is formed of the same material layer as that of the first gate signal line; the first target insulating layer close to the substrate is formed of the same material layer as that of the second gate insulating layer; the second target insulating layer close to the substrate is formed of the same material layer as that of the interlayer dielectric layer; the second conductor layer close to the substrate is formed of the same material layer as that of the data signal line; the second conductor layer close to the substrate is connected to the data signal line, and any one of the two conductor layers is connected to the driver IC.

Optionally, the display panel comprises: a substrate base, and an active layer, a first gate insulating layer, a first gate signal line, a second gate insulating layer, a second gate signal line, an interlayer dielectric layer and a data signal line which are arranged on the substrate base in sequence; the connector comprises a substrate on which three conductor layers and two target insulating layers are arranged, the conductor layers and the target insulating layers are alternately arranged; the first conductor layer close to the substrate is formed of the same material layer as that of the first gate signal line; wherein the first target insulating layer close to the substrate is formed of the same material layer as that of the second gate insulating layer; the second conductor layer close to the substrate is formed of the same material layer as that of the second gate signal line; the second target insulating layer close to the substrate is formed of the same material layer as that of the interlayer dielectric layer; the third conductor layer close to the substrate is formed of the same material layer as that of the data signal line; the third conductor layer close to the substrate is connected to the data signal line, and any one of the third conductor layers is connected to the driver IC.

Optionally, the display panel comprises: a substrate base, and an active layer, a first gate insulating layer, a first gate signal line, a second gate insulating layer, a second gate signal line, an interlayer dielectric layer and a data signal line which are arranged on the substrate base in sequence; the connector comprises a substrate on which two conductor layers and one target insulating layer are arranged, the target insulating layer being arranged between the two conductor layers; wherein the first conductor layer close to the substrate is formed of the same material layer as that of the second gate signal line; the target insulating layer is formed of the same material layer as that of the interlayer dielectric layer; the second conductor layer close to the substrate is formed of the same material layer as that of the data signal line; the second conductor layer close to the substrate is connected to the data signal line, and any one of the two conductor layers is connected to the driver IC.

Optionally, the substrate comprises: a PI substrate, and a water blocking layer, a buffer layer and an auxiliary insulating layer which are arranged on the PI substrate in sequence, wherein the m conductor layers are arranged on the auxiliary insulating layer, and the auxiliary insulating layer is formed of the same material layer as that of the first gate insulating layer.

Optionally, the substrate comprises: a PI substrate, and a water blocking layer, a buffer layer and an auxiliary insulating layer which are arranged on the PI substrate in sequence, wherein the m conductor layers are arranged on the auxiliary insulating layer, and the auxiliary insulating layer is formed of the same material layer as that of the first gate insulating layer.

In yet another aspect, there is provided a method for manufacturing a display screen, comprising the following steps: forming a connector by arranging, on a substrate, a conductor structure whose target surface away from the substrate is uneven; connecting one end of the conductor structure to a data signal line on a display panel; connecting the other end of the conductor structure to a driver IC; and bending the connector to arrange the driver IC on a non-display side of the display panel.

Optionally, the display panel comprises: a substrate base, and an active layer, a first gate insulating layer, a first gate signal line, a second gate insulating layer, a second gate signal line, an interlayer dielectric layer and a data signal line which are arranged on the substrate base in sequence, wherein the step of forming the connector by arranging, on the substrate, the conductor structure whose target surface away from the substrate is uneven comprises: forming two conductor layers and two target insulating layers on the substrate, the two target insulating layers being stacked between the two conductor layers, wherein the first conductor layer close to the substrate is formed of the same material layer as that of the first gate signal line; the first target insulating layer close to the substrate is formed of the same material layer as that of the second gate insulating layer; the second target insulating layer close to the substrate is formed of the same material layer as that of the interlayer dielectric layer; the second conductor layer close to the substrate is formed of the same material layer as that of the data signal line; the step of connecting one end of the conductor structure to the data signal line on the display panel comprises: connecting the second conductor layer close to the substrate to the data signal line; the step of connecting the other end of the conductor structure to the driver IC comprises: connecting any one of the two conductor layers to the driver IC.

Optionally, the display panel comprises: a substrate base, and an active layer, a first gate insulating layer, a first gate signal line, a second gate insulating layer, a second gate signal line, an interlayer dielectric layer and a data signal line which are arranged on the substrate base in sequence; the step of forming the connector by arranging, on the substrate, the conductor structure whose target surface away from the substrate is uneven comprises: forming three conductor layers and two target insulating layers on the substrate, the conductor layers and the target insulating layers are alternately arranged, wherein the first conductor layer close to the substrate is formed of the same material layer as that of the first gate signal line; the first target insulating layer close to the substrate is formed of the same material layer as that of the second gate insulating layer; the second conductor layer close to the substrate is formed of the same material layer as that of the second gate signal line; the second target insulating layer close to the substrate is formed of the same material layer as that of the interlayer dielectric layer; the third conductor layer close to the substrate is formed of the same material layer as that of the data signal line; the step of connecting one end of the conductor structure to the data signal line on the display panel comprises: connecting the third conductor layer close to the substrate to the data signal line; and the step of connecting the other end of the conductor structure to the driver IC comprises: connecting any one of the third conductor layers to the driver IC.

Optionally, the display panel comprises: a substrate base, and an active layer, a first gate insulating layer, a first gate signal line, a second gate insulating layer, a second gate signal line, an interlayer dielectric layer and a data signal line which are arranged on the substrate base in sequence, wherein the step of forming the connector by arranging, on the substrate, the conductor structure whose target surface away from the substrate is uneven comprises: forming two conductor layers and one target insulating layer on the substrate, the one target insulating layer being arranged between the two conductor layers, wherein the first conductor layer close to the substrate is formed of the same material layer as that of the second gate signal line; the one target insulating layer is formed of the same material layer as that of the interlayer dielectric layer; the second conductor layer close to the substrate is formed of the same material layer as that of the data signal line; the step of connecting one end of the conductor structure to the data signal line on the display panel comprises: connecting the second conductor layer close to the substrate to the data signal line; the step of connecting the other end of the conductor structure to the driver IC comprises: connecting any one of the two conductor layers to the driver IC.

DETAILED DESCRIPTION

To make the principles and advantages of the present disclosure clearer, the embodiments of the present disclosure are further described in detail below with reference to the accompanying drawings.

As known by the inventors, the display screen generally includes: a display panel, a driver IC and a connector. The connector is configured to connect the display panel and the driver IC. Herein, the connector includes: a substrate, and a conductor layer arranged on the substrate. One end of the conductor layer is connected to a data signal line on the display panel, and the other end of the conductor layer is connected to the driver IC. The substrate is generally made of an inorganic material. The driver IC may send control signals (also referred to as data signals) to the data signal line through the connector, so as to control the display panel to display different images according to the control signals. In order to make a frame of the display screen narrower, it is necessary to arrange the driver IC on a non-display side (the side opposite to a display side) of the display panel, and bend the connector.

Figure 1:
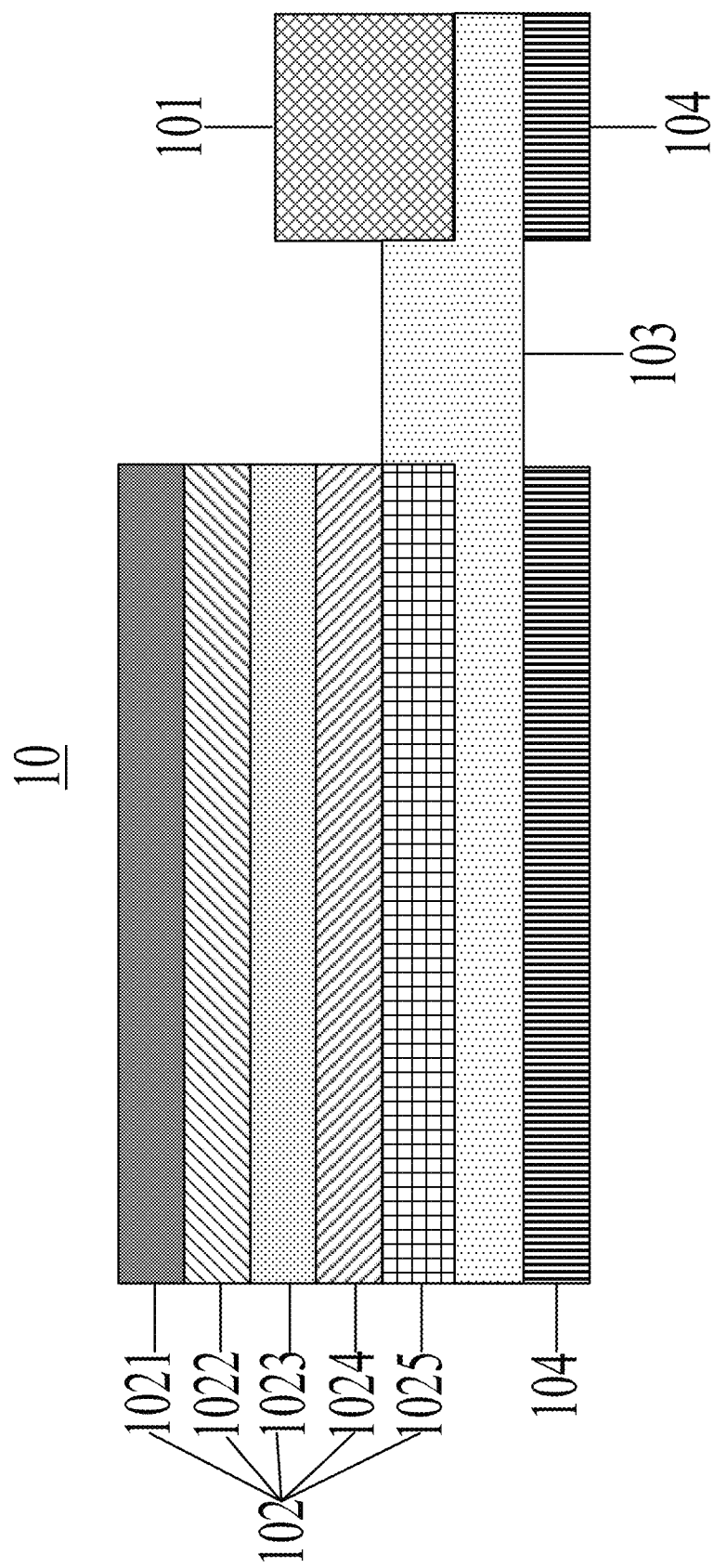
FIG. 1 is a schematic diagram of a structure of a display screen according to an embodiment of the present disclosure.

Exemplarily, FIG. 1 is a schematic diagram of a structure of a display screen provided in an embodiment of the present disclosure. FIG. 1 illustrates a display screen when the connector is not bent. As shown in FIG. 1, the display screen 10 includes a driver IC 101, a display panel 102, a connector 103 and a protection film 104. The display panel 102 includes: a touch panel 1021, a polaroid 1022, a thin film encapsulation (TFE) 1023, an organic light-emitting diode (OLED) 1024, and a thin film transistor array 1025.

The touch panel 1021 is arranged opposite to the thin film transistor array 1025. The OLED 1024 and the TFE 1023 are arranged sequentially on one side, close to the touch panel 2021, of the thin film transistor array 1025. The polaroid 1022 is arranged on one side, close to the thin film transistor array 1025, of the touch panel 1021.

One end of the connector 103 is arranged on one side, away from the touch panel 1021, of the thin film transistor array 1025, and the other end of the connector 103 is in contact with the driver IC 101. A central region (i.e., a region between the display panel and the driver IC) of the connector 103 may be provided with a conductor layer (not shown in FIG. 1). The conductor layer is connected to the thin film transistor array 1025 and the driver IC 101 respectively. The driver IC 101 may send control signals to the thin film transistor array 1025 through the connector 103, so as to control the display panel 102 to display different images.

A protection film 104 may both be arranged on one side, away from the touch panel 1021, of the thin film transistor array 1025 and on one side, away from the driver IC 101, of the other end of the connector 103.

It should be noted that the display panel 102 has opposite sides, i.e., a display side and a non-display side. Herein, the polaroid 1022 and the touch panel 1021 are located on the display side of the display panel 102, and the protection film 104 is located on the non-display side of the display panel 102.

Figure 2:
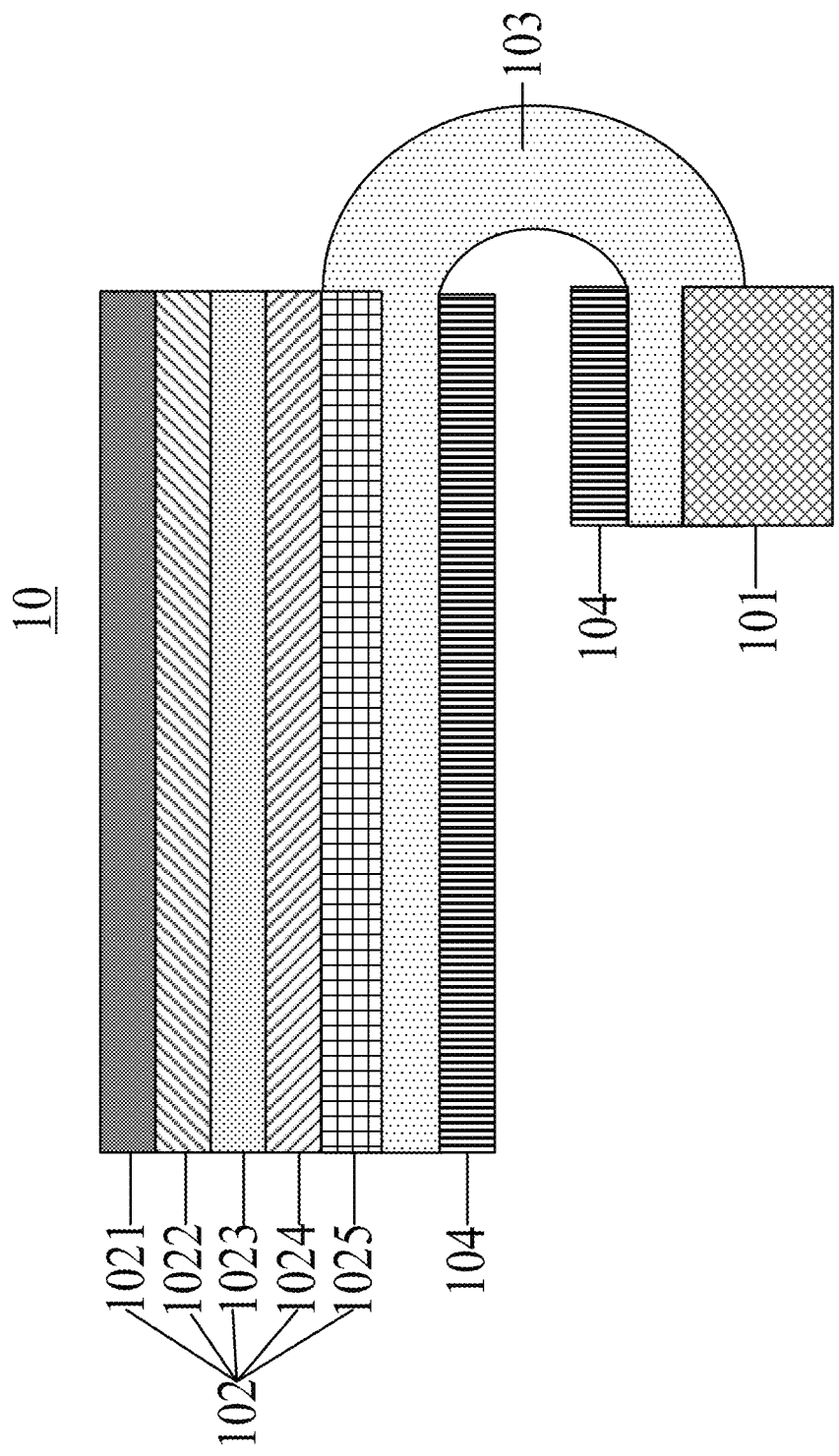
FIG. 2 is a schematic diagram of a structure of another display screen according to an embodiment of the present disclosure.

FIG. 2 is a schematic diagram of a structure of another display screen provided in an embodiment of the present disclosure. FIG. 2 illustrates a display screen when the connector is bent. As shown in FIG. 2, after the connector 103 is bent, the driver IC 101 is arranged on the non-display side of the display panel.

Figure 3:
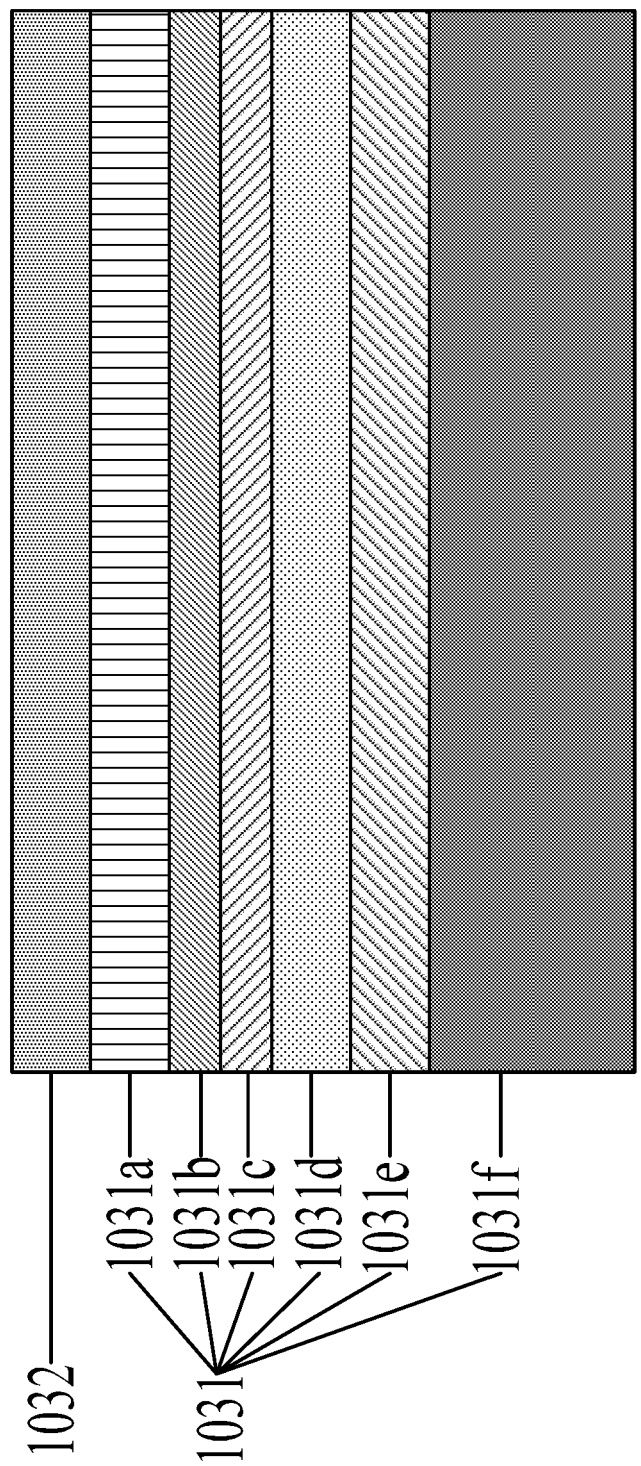
FIG. 3 is a schematic diagram of a structure of a connector according to a prior art.

As shown in FIG. 3, the connector 103 which is not bent includes: a substrate 1031, and a conductor layer 1032 arranged on the substrate 1031. Exemplarily, the substrate 1031 may include: a polyimide (PI) substrate 1031$f$, a water blocking layer 1031$e$, a buffer layer 1031$d$, a first gate insulating layer 1031$c$, a second gate insulating layer 1031$b$ and an interlayer insulating layer 1031$a$ which are stacked in sequence. The interlayer insulating layer 1031$a$ is arranged close to the conductor layer 1032.

One end of the PI substrate 1031$f$ may be arranged on one side, away from the touch panel, of the thin film transistor array in the display panel, and the other end of the PI substrate 1031$f$ is in contact with the driver IC. The interlayer insulating layer, the second gate insulating layer, the first gate insulating layer, the buffer layer and the water blocking layer are usually made of an inorganic material, and the total thickness of the five inorganic material layers is 2.4 microns approximately. Due to high brittleness of the inorganic material, the inorganic material is more likely to fracture when the connector is bent. In addition, when the connector is bent, the inorganic material will generate a stress inside for resisting the bending. However, the conductor layer arranged on the inorganic material is more likely to be broken under the stress of the inorganic material, thereby causing ineffective connection between the driver IC and the data signal line and affecting the display effect of the display screen.

FIG. 4$a$ is a schematic diagram of a structure of a connector provided in an embodiment of the present disclosure. FIG. 4$a$ illustrates a connector which is not bent, where a portion, located between the display panel and the driver IC, in the connector, rather than the display panel and the driver IC, is shown. As shown in FIG. 4$a$, the connector 60 includes: a substrate 601, and a conductor structure 602 arranged on the substrate 601. One end of the conductor structure 602 is connected to a data signal line on the display panel, and the other end of the conductor structure 602 is connected to the driver IC arranged on the non-display side of the display panel. Exemplarily, the left end of the conductor structure 602 may be connected to the data signal line on the display panel, and the right end of the conductor structure 602 may be connected to the driver IC. A surface, away from the substrate 601, of the conductor structure 602 is a target surface (not shown in FIG. 4$a$) of the conductor structure 602. The target surface is uneven.

As shown in FIG. 4$a$, the substrate 601 may include a target region B, and a first edge region A and a second edge region C which are located on two sides of the target region B respectively. Exemplarily, the first edge region A may be arranged close to the display panel, and the second edge region C may be arranged close to the driver IC. The target region B may be a portion that needs to be bent when the connector 60 is bent. That is, the first edge region A may serve as a transition from the display panel to the target region B, and the second edge region C may serve as a transition from the target region B to the driver IC. Therefore, the condition that the display panel is damaged by direct bending from the edge of the display panel or the condition that the driver IC is damaged by direct bending from the edge of the driver IC is prevented.

Exemplarily, as shown in FIG. 4$a$, portions located on the target surface B, the first edge region A and the second edge region C in the target surface may be uneven, respectively.

From the above, the target surface of the conductor structure in the connector provided in the embodiments of the present disclosure is uneven, which is conductive to releasing the stress acting on the conductor structure when the substrate is bent. Therefore, the conductor structure is less affected by this stress, thereby reducing the probability of the conductor structure breaking under the stress of the substrate. Further, the case that the driver IC and the data signal line cannot be effectively connected due to the breakage of the conductor structure is prevented, thereby ensuring that the display screen has a good display effect.

Optionally, the structure of the connector 60 may also be shown in FIG. 4$b$, where a portion, located on the target region B, in the target surface may be uneven, and portions, located on the first edge region A and the second edge region B, in the target surface may be even.

Figure 4A:
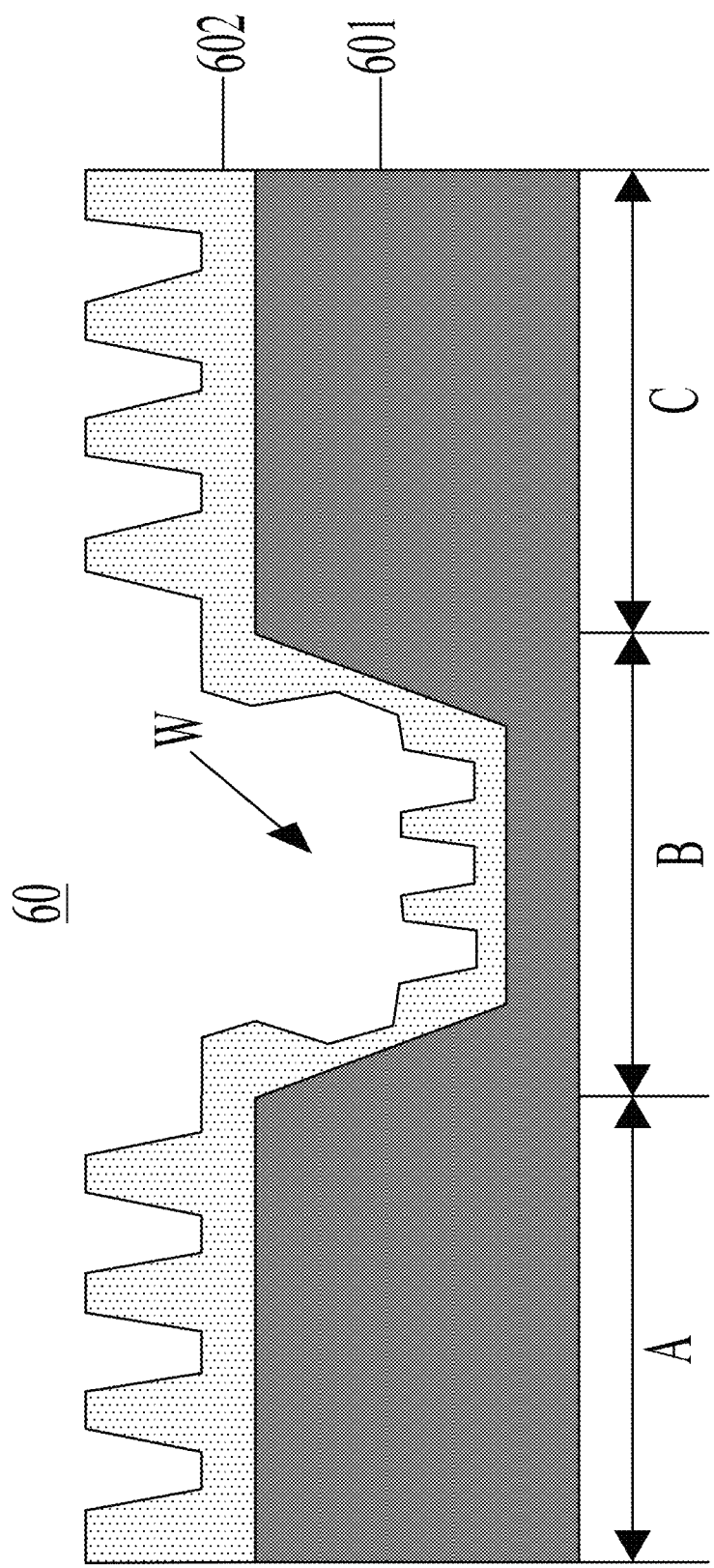
FIG. 4a is a schematic diagram of a structure of a connector according to an embodiment of the present disclosure.
Figure 4B:
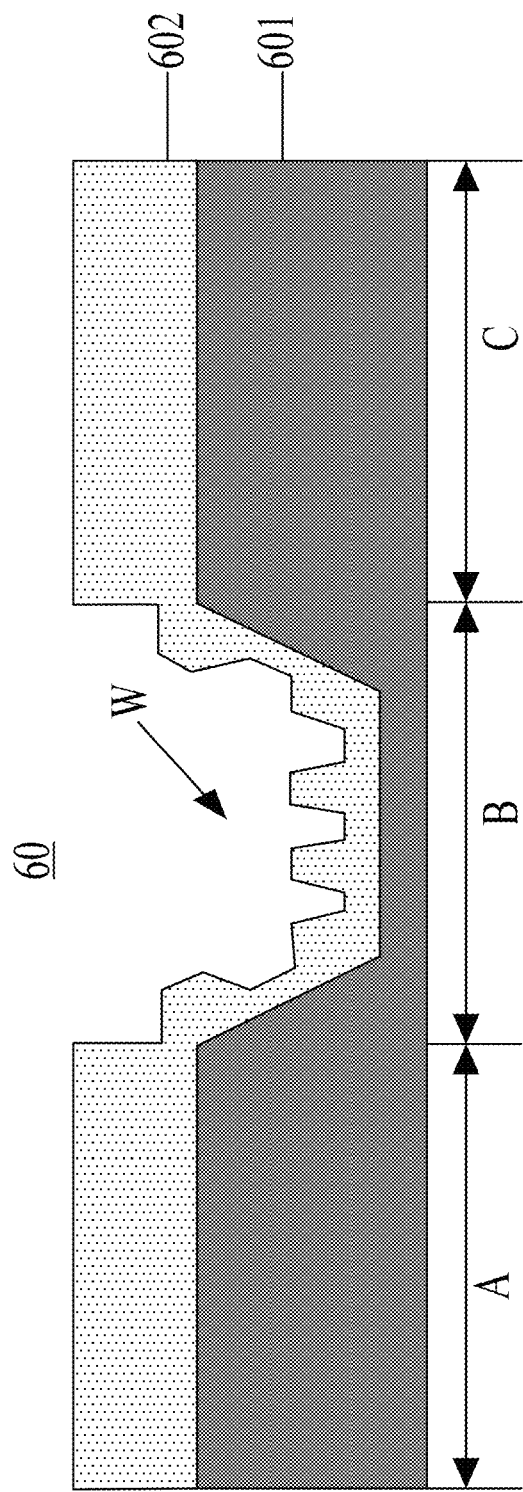
FIG. 4b is a schematic diagram of a structure of another connector according to an embodiment of the present disclosure.

Optionally, referring to FIG. 4a or FIG. 4b, the target region B of the substrate may be provided with a groove W whose opening faces the conductor structure 602, such that the thickness of the target region B is relatively small, thereby further reducing the possibility that the target region B is broken when the connector 60 is bent.

Further, the conductor structure 602 may include: m conductive layers arranged on the substrate 601 and n target insulating layers further arranged on the substrate 601, where m≥2, n≥1. It should be noted that a plurality of conductor layers and n target insulating layers are not shown in FIG. 4a and FIG. 4b.

Herein, the m conductor layers may include: a data conductor layer and a circuit conductor layer. The data conductor layer may be connected to the data signal line. The circuit conductor layer may be connected to the driver IC. The n target insulating layers may be located among the m conductor layers, and the m conductor layers may be connected through via holes on the n target insulating layers. Exemplarily, at least one target insulating layer may be arranged between every two adjacent conductor layers in the m conductor layers. There may be a plurality of via holes on the n target insulating layers. The plurality of via holes may be located on the target region only, or located on the entire substrate.

In the connector provided in the embodiments of the present disclosure, a plurality of conductor layers which are connected with each other are used. The data conductor layers in the plurality of conductor layers are connected to the data signal line on the display panel. The circuit conductor layer is connected to the driver IC arranged on the non-display side of the display panel. The driver IC may send control signals to the display panel through the plurality of conductor layers. When the connector is bent, even if one conductor layer is broken, the driver IC may also continue to be effectively connected to the data signal line through other conductor layers, such that the display screen may continue to have a good display effect.

It should be noted that the connector provided in the embodiment of the present disclosure has various implementation manners. The following seven implementation manners are illustrated in the embodiments of the present disclosure. In addition, in the following seven implementation manners, two recesses on the target surface of the conductor structure 602 represent the unevenness of the target surface of the conductor structure 602. The target insulating layer having two via holes or four via holes thereon is taken as an example only.

Figure 5A:
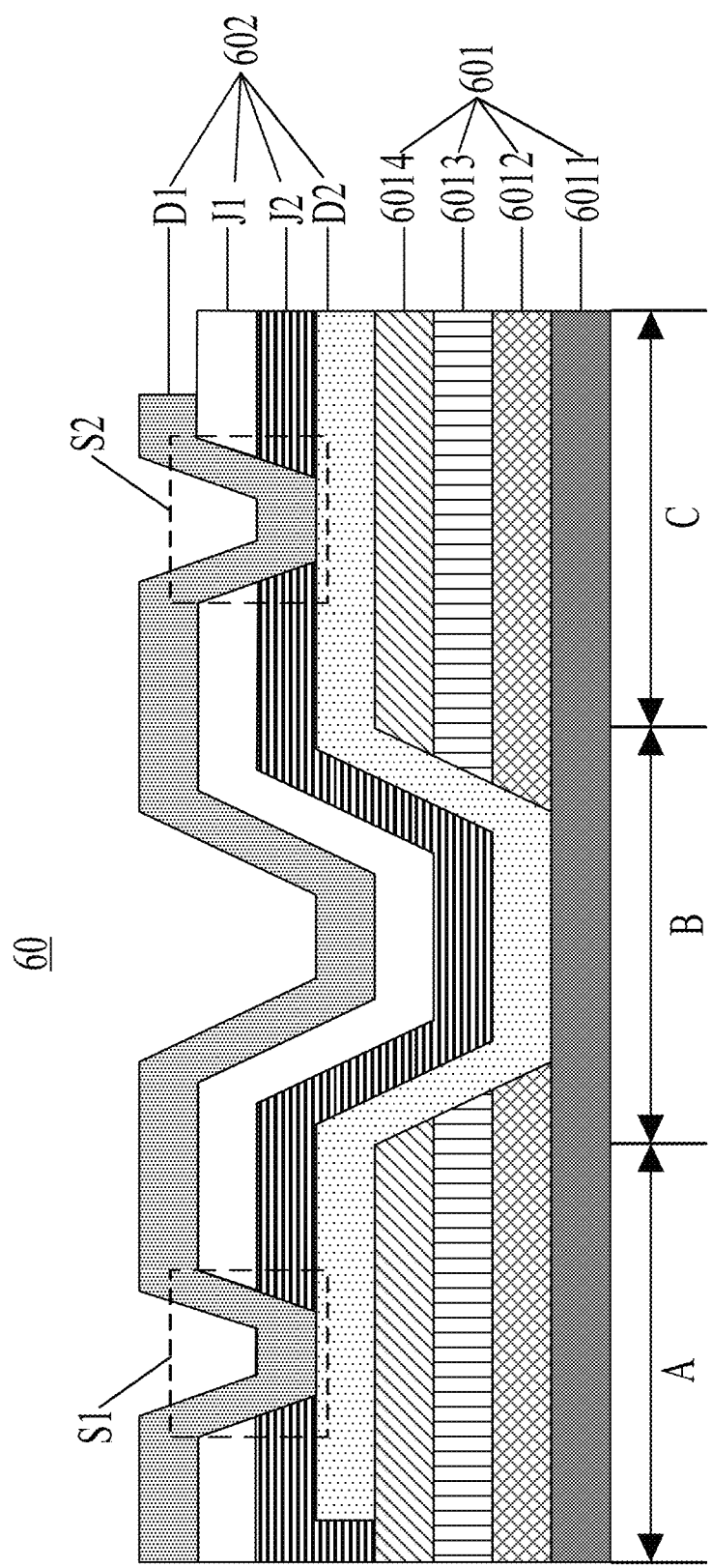
FIG. 5a is a schematic diagram of a structure of yet another connector according to an embodiment of the present disclosure.

In the first implementation manner, referring to FIG. 5a, m=2, n=2. That is, the conductor structure 602 includes: two conductor layers (the conductor layer D1 and the conductor layer D2) arranged on the substrate 601, and two target insulating layers (the insulating layer J1 and the insulating layer J2) also arranged on the substrate 601. The conductor layer D1 may be the second conductor layer, close to the substrate 601, of the two conductor layers. The conductor layer D2 may be the first conductor layer, close to the substrate 601, of the two conductor layers. The insulating layer J1 and the insulating layer J2 are stacked between the conductor layer D1 and the conductor layer D2. Herein, the conductor layer D1 is a data conductor layer, and the conductor layer D2 is a circuit conductor layer. That is, the left end of the conductor layer D1 is connected to the data signal line in the display panel, and the right end of the conductor layer D2 is connected to the driver IC.

The substrate 601 may include: a PI base 6011, and a water blocking layer 6012, a buffer layer 6013 and an auxiliary insulating layer 6014 which are sequentially stacked on the PI base 6011. The thickness of the PI substrate may be greater than or equal to 1 micron and less than or equal to 20 microns. The substrate 601 may be divided into a first edge region A, a target region B and a second edge region C. The target region B is provided with a groove (not shown in FIG. 5a) whose depth may be equal to the sum of the thicknesses of the water blocking layer 6012, the buffer layer 6013 and the auxiliary insulating layer 6014.

Exemplarily, a manufacturing process of the connector in the first implementation manner refers to FIGS. 5a to 5e.

Figure 5B:
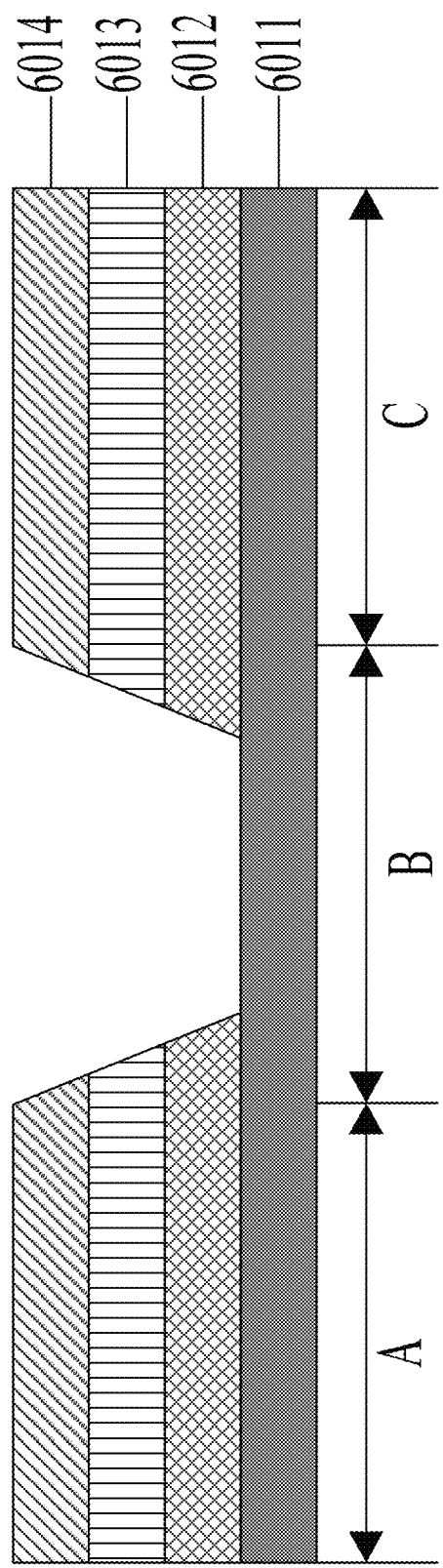
FIG. 5b is a schematic diagram of a structure of a base according to an embodiment of the present disclosure.
Figure 5C:
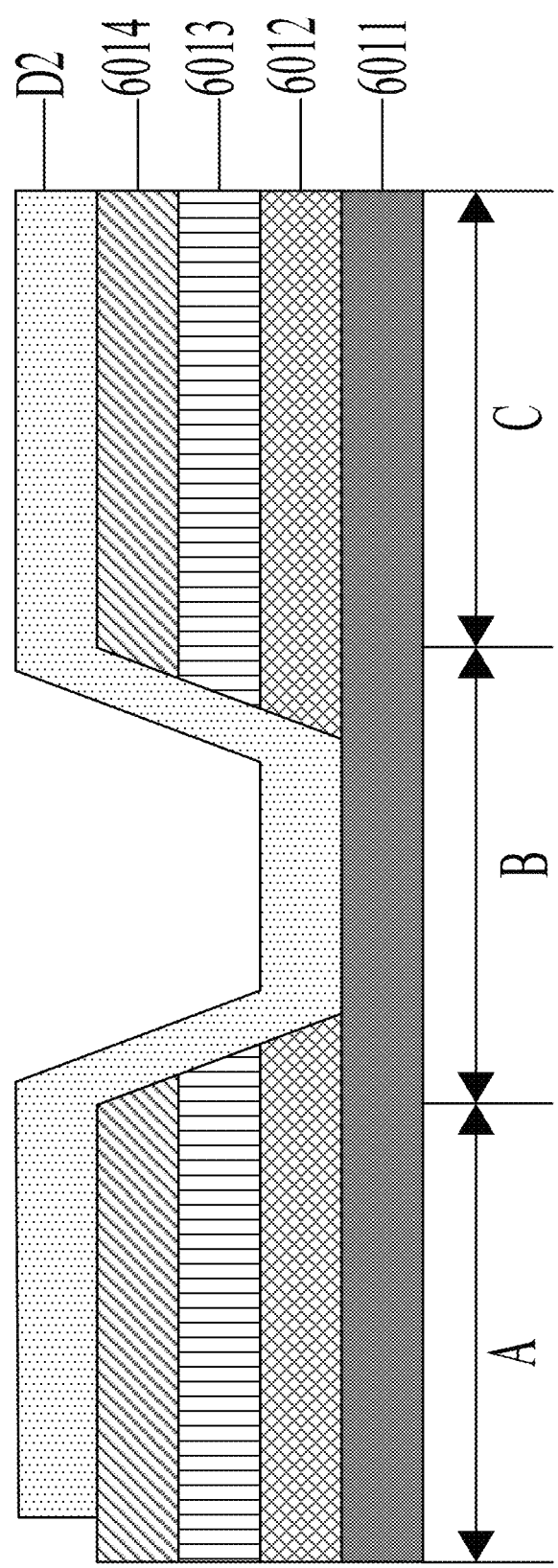
FIG. 5c is a schematic diagram of a structure of a connector after a circuit conductor layer is formed according to an embodiment of the present disclosure.
Figure 5D:
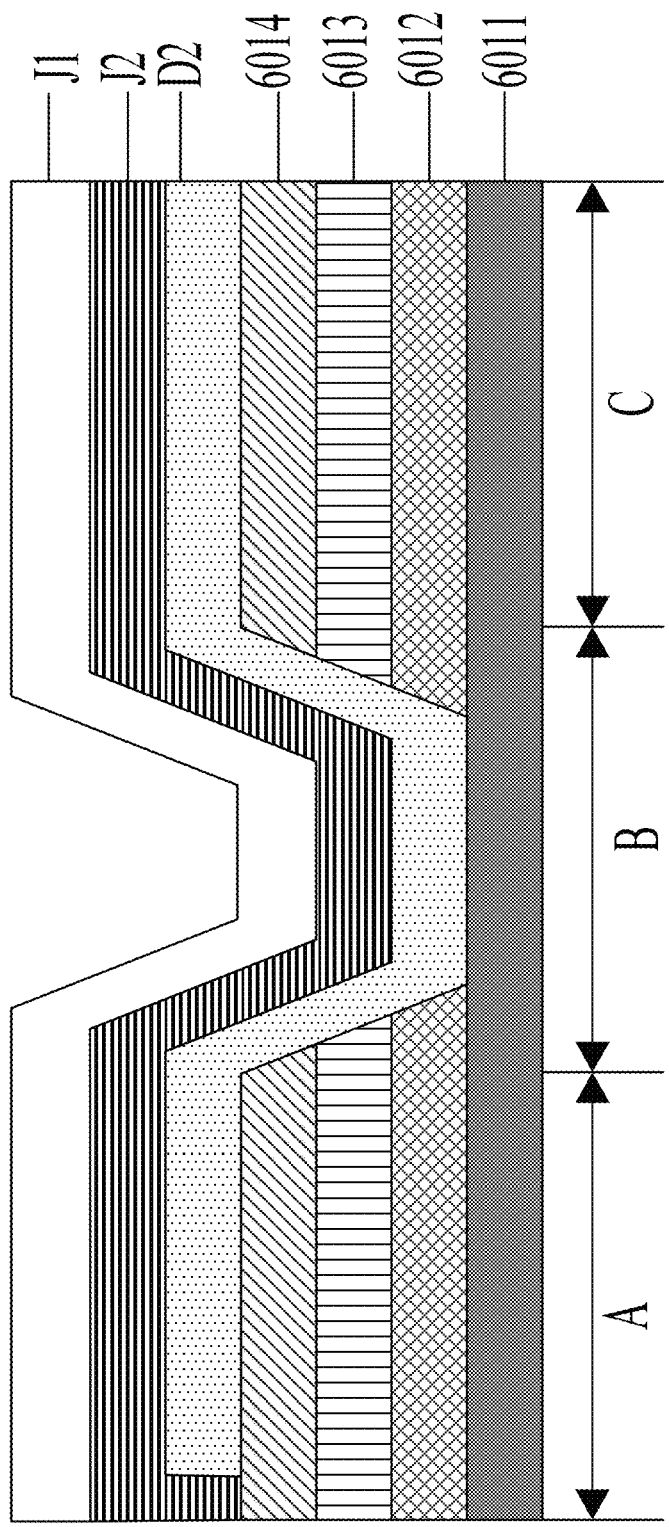
FIG. 5d is a schematic diagram of a structure of a connector after a target insulating layer is formed according to an embodiment of the present disclosure.
Figure 5E:
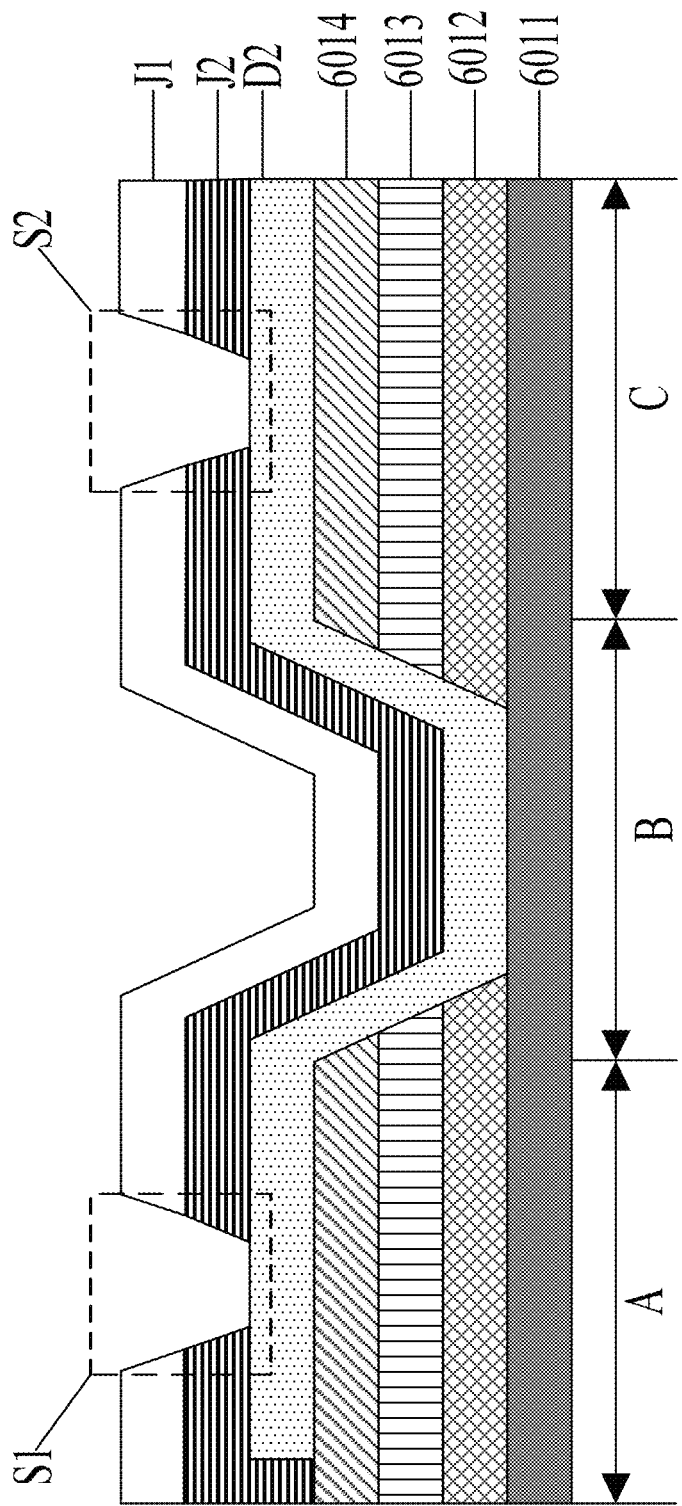
FIG. 5e is a schematic diagram of a structure of a connector after via holes are formed on the target insulating layer according to an embodiment of the present disclosure.

As shown in FIG. 5b, in the course of manufacturing the connector, the PI substrate 6011, the water blocking layer 6012, the buffer layer 6013 and the auxiliary insulating layer 6014 may be sequentially formed on a bearing substrate (not shown in FIG. 5b) first. Then, the water blocking layer 6012, the buffer layer 6013 and the auxiliary insulating layer 6014 are etched, such that a groove is formed in the substrate (including the PI substrate 6011, the water blocking layer 6012, the buffer layer 6013 and the auxiliary insulating layer 6014). The substrate may be divided into a first edge region A, a target region B and a second edge region C. The groove is located in the target region B. The PI base and the water blocking layer 6012 may be made into a single layer or multiple layers. Later, as shown in FIG. 5c and FIG. 5d, the conductor layer D2 (i.e., the circuit conductor layer), the insulating layer J2 and the insulating layer J1 may continue to be sequentially formed on the auxiliary insulating layer 6014 and the groove, such that the right end of the conductor layer D2 is connected to the driver IC. As shown in FIG. 5e, after the insulating layer J1 is formed, the insulating layer J2 and the insulating layer J1 may be etched, such that a plurality of via holes are formed on the insulating layer J2 and the insulating layer J1 respectively, and therefore, the conductor layer D2 at the plurality of via holes is exposed. It should be noted that only two (the via hole S1 and the via hole S2) of the plurality of via holes are shown in FIG. 5e. Then, as shown in FIG. 5a, a conductor layer D1 (i.e., the data conductor layer) may be formed on the insulating layer J1. The left end of the conductor layer D1 is connected to the data signal line in the display panel. In addition, the conductor layer D1 is in contact and connection with the conductor layer D2 through the plurality of via holes on the insulating layer J2 and the insulating layer J1. Finally, the bearing substrate may be stripped to obtain the connector as shown in FIG. 5a.

Figure 6A:
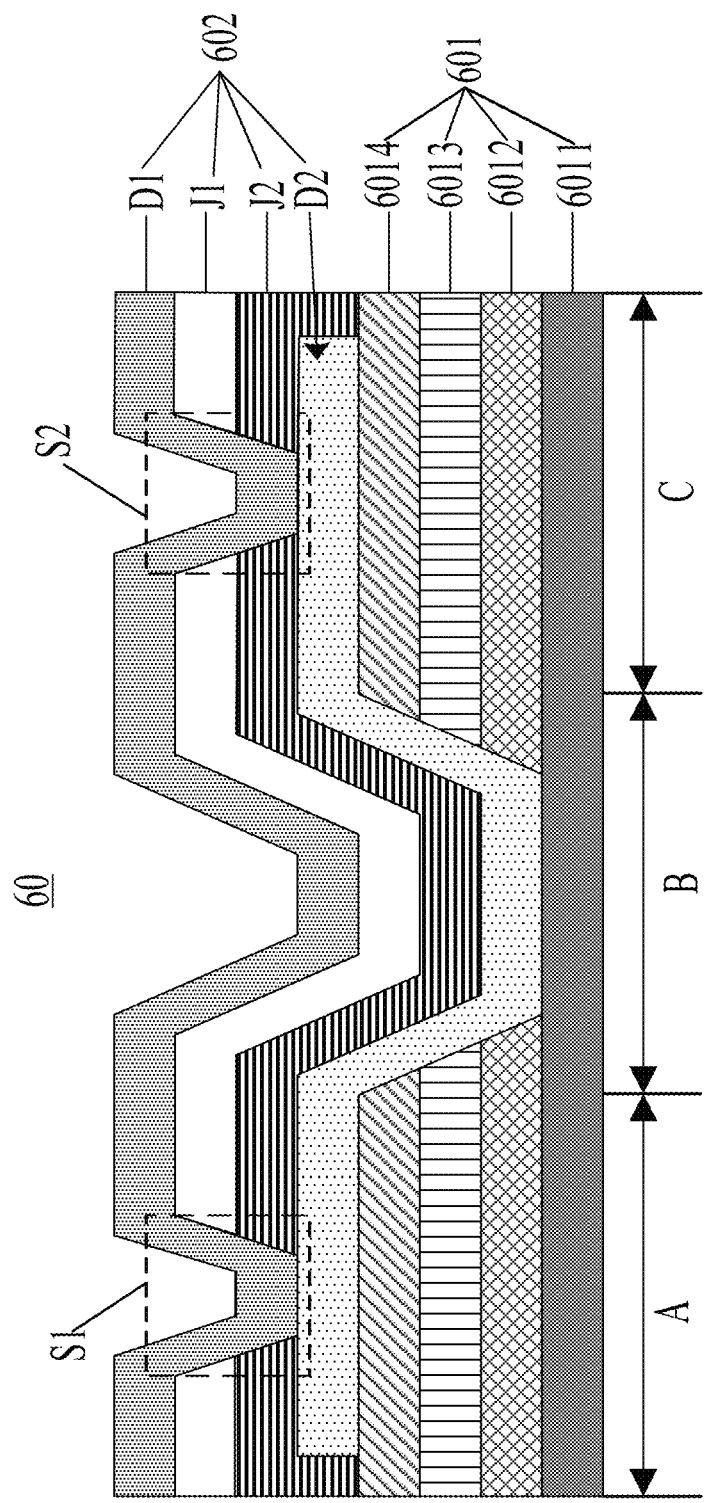
FIG. 6a is a schematic diagram of a structure of still yet another connector according to an embodiment of the present disclosure.

In the second implementation manner, referring to FIG. 6a, m=2, n=2. That is, the conductor structure 602 includes two conductor layers (the conductor layer D1 and the conductor layer D2) arranged on the substrate 601 and two target insulating layers (the insulating layer J1 and the insulating layer J2) also arranged on the substrate 601. The conductor layer D1 may be the second conductor layer, close to the substrate 601, of the two conductor layers. The conductor layer D2 may be the first conductor layer, close to the substrate 601, of the two conductor layers. The insulating layer J1 and the insulating layer J2 are stacked between the conductor layer D1 and the conductor layer D2. Herein, the conductor layer D1 serves as the data conductor layer and the circuit conductor layer at the same time. That is, the left end of the conductor layer D1 is connected to the data signal line in the display panel, and the right end of the conductor layer D1 is connected to the driver IC. The structure of the substrate 601 may refer to the structure of the substrate in the first implementation manner of the connector, which is not described repeatedly in the embodiments of the present disclosure.

Exemplarily, a manufacturing process of the connector in the second implementation manner refers to FIGS. 6a to 6e.

Figure 6B:
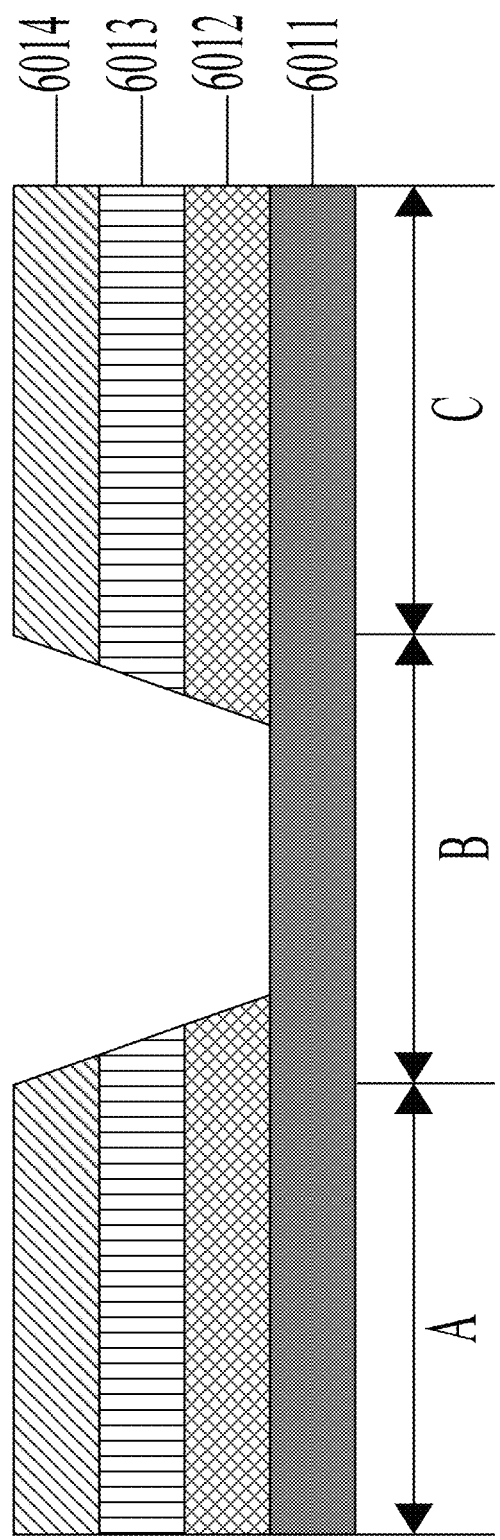
FIG. 6b is a schematic diagram of a structure of another base according to an embodiment of the present disclosure.
Figure 6C:
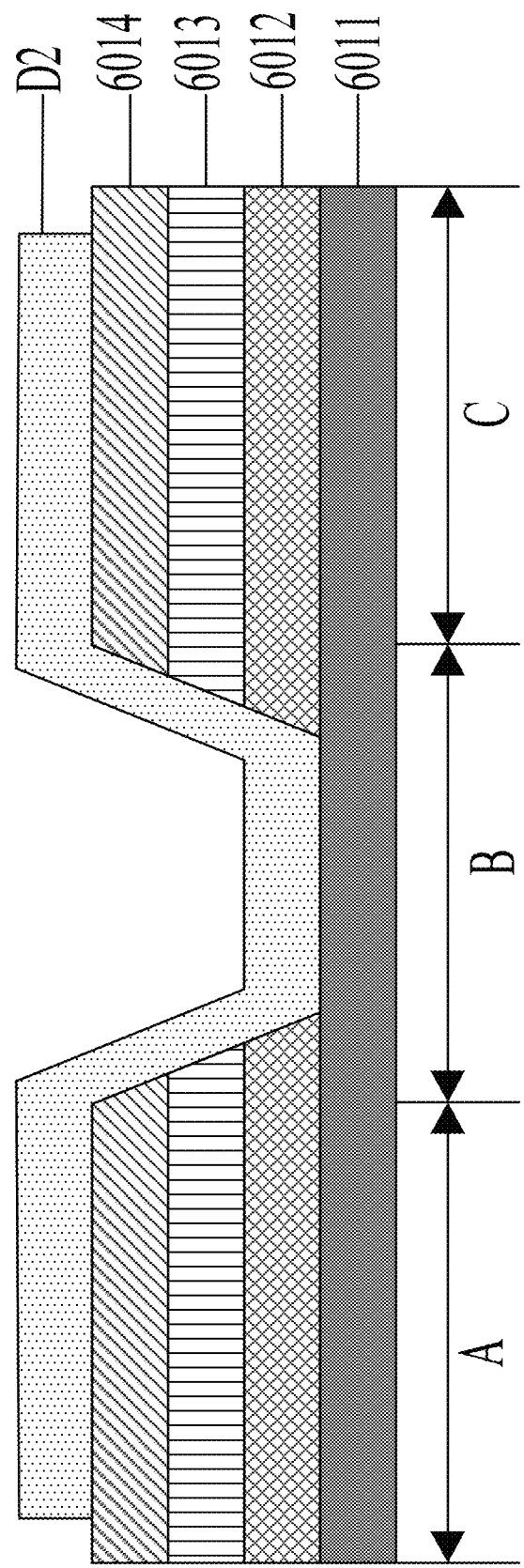
FIG. 6c is a schematic diagram of a structure of a connector after a conductor layer is formed according to an embodiment of the present disclosure.
Figure 6D:
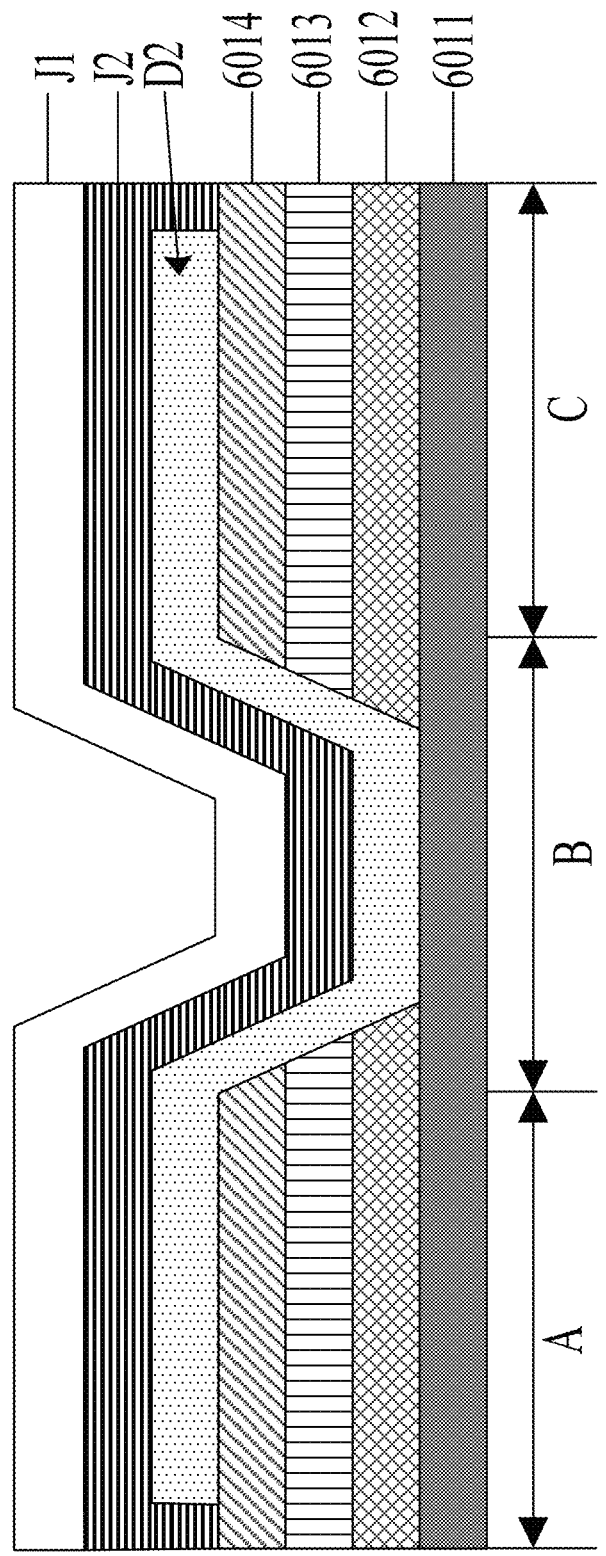
FIG. 6d is a schematic diagram of a structure of another connector after a target insulating layer is formed according to an embodiment of the present disclosure.
Figure 6E:
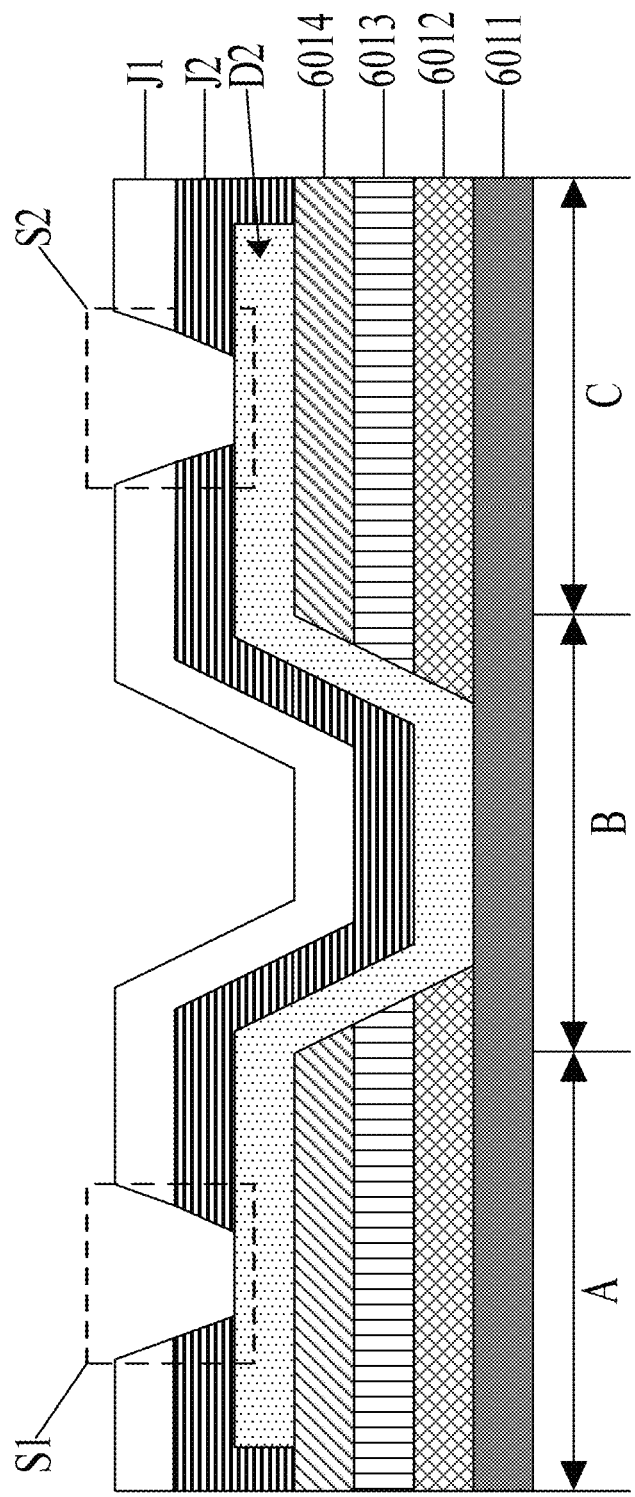
FIG. 6e is a schematic diagram of a structure of another connector after via holes are formed on the target insulating layer according to an embodiment of the present disclosure.

As shown in FIG. 6b, in the course of manufacturing the connector, the PI substrate 6011, the water blocking layer 6012, the buffer layer 6013 and the auxiliary insulating layer 6014 may be formed on a bearing substrate (not shown in FIG. 6b) first. Then, the water blocking layer 6012, the buffer layer 6013 and the auxiliary insulating layer 6014 are etched, such that a groove is formed in the substrate (including the PI substrate 6011, the water blocking layer 6012, the buffer layer 6013 and the auxiliary insulating layer 6014). The substrate may be divided into a first edge region A, a target region B and a second edge region C. The groove is located in the target region B. The PI base 6011 and the water blocking layer 6012 may be made into a single layer or multiple layers. Later, as shown in FIG. 6c and FIG. 6d, the conductor layer D2, the insulating layer J2 and the insulating layer J1 may continue to be sequentially formed on the auxiliary insulating layer 6014 and the groove. As shown in FIG. 6e, after the insulating layer J1 is formed, the insulating layer J2 and the insulating layer J1 may be etched, such that a plurality of via holes are formed on the insulating layer J2 and the insulating layer J1 respectively, and therefore, the conductor layer D2 at the plurality of via holes is exposed. It should be noted that only two (the via hole S1 and the via hole S2) of the plurality of via holes are shown in FIG. 6e. Then, as shown in FIG. 6a, a conductor layer D1 (i.e., the data conductor layer or the circuit conductor layer) may be formed on the insulating layer J1. The left end of the conductor layer D1 is connected to the data signal line in the display panel. The right end of the conductor layer D1 is connected to the driver IC. In addition, the conductor layer D1 is in contact and connection with the conductor layer D2 through the plurality of via holes on the insulating layer J2 and the insulating layer J1. Finally, the bearing substrate may be stripped to obtain the connector as shown in FIG. 6a.

Figure 7A:
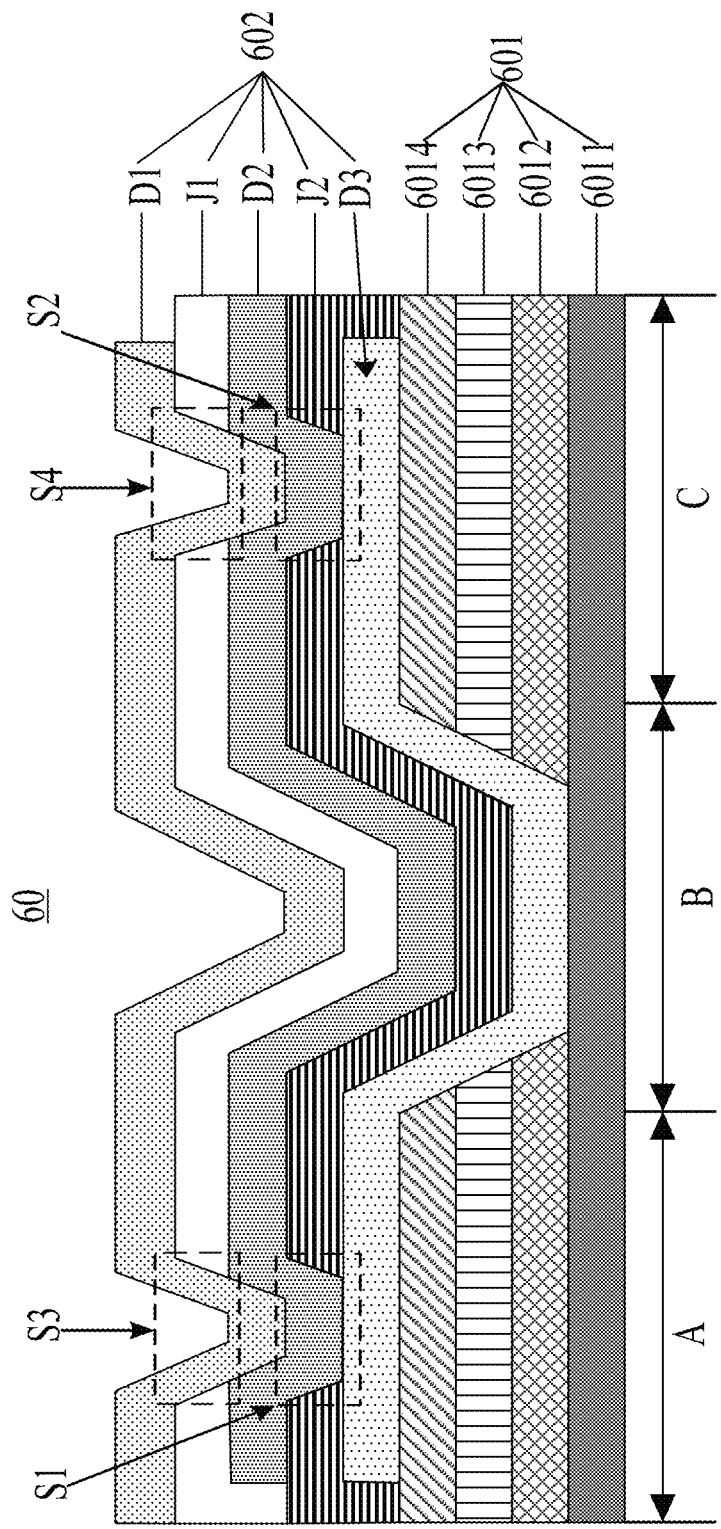
FIG. 7a is a schematic diagram of a structure of another connector according to an embodiment of the present disclosure.

In the third implementation manner, referring to FIG. 7a, m=3, n=2. That is, the conductor structure 602 includes third conductor layers (the conductor layer D1, the conductor layer D2 and the conductor layer D3) arranged on the substrate 601 and two target insulating layers (the insulating layer J1 and the insulating layer J2) also arranged on the substrate 601. The conductor layer D1 may be the third conductor layer close to the substrate 601. The conductor layer D2 may be the second conductor layer close to the substrate 601. The conductor layer D3 may be the first conductor layer, close to the substrate 601, of the three conductor layers. The two insulating layers and the three conductor layers are alternately arranged. Exemplarily, the insulating layer J1 is arranged between the conductor layer D1 and the conductor layer D2, and the insulating layer J2 is arranged between the conductor layer D2 and the conductor layer D3. Herein, the conductor layer D1 is the data conductor layer, and the conductor layer D2 is the circuit conductor layer. That is, the left end of the conductor layer D1 is connected to the data signal line in the display panel, and the right end of the conductor layer D2 is connected to the driver IC. The structure of the substrate may refer to the structure of the substrate in the first implementation manner of the connector, which is not described repeatedly in the embodiments of the present disclosure.

Exemplarily, a manufacturing process of the connector in the third implementation manner refers to FIGS. 7a to 7f.

Figure 7B:
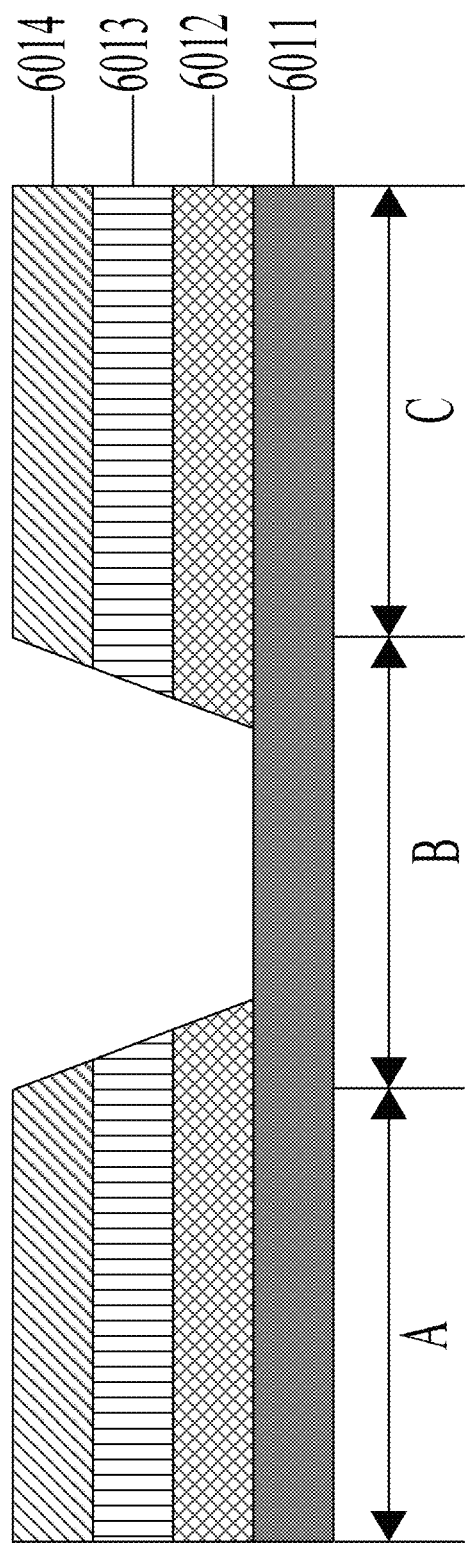
FIG. 7b is a schematic diagram of a structure of another base according to an embodiment of the present disclosure.
Figure 7C:
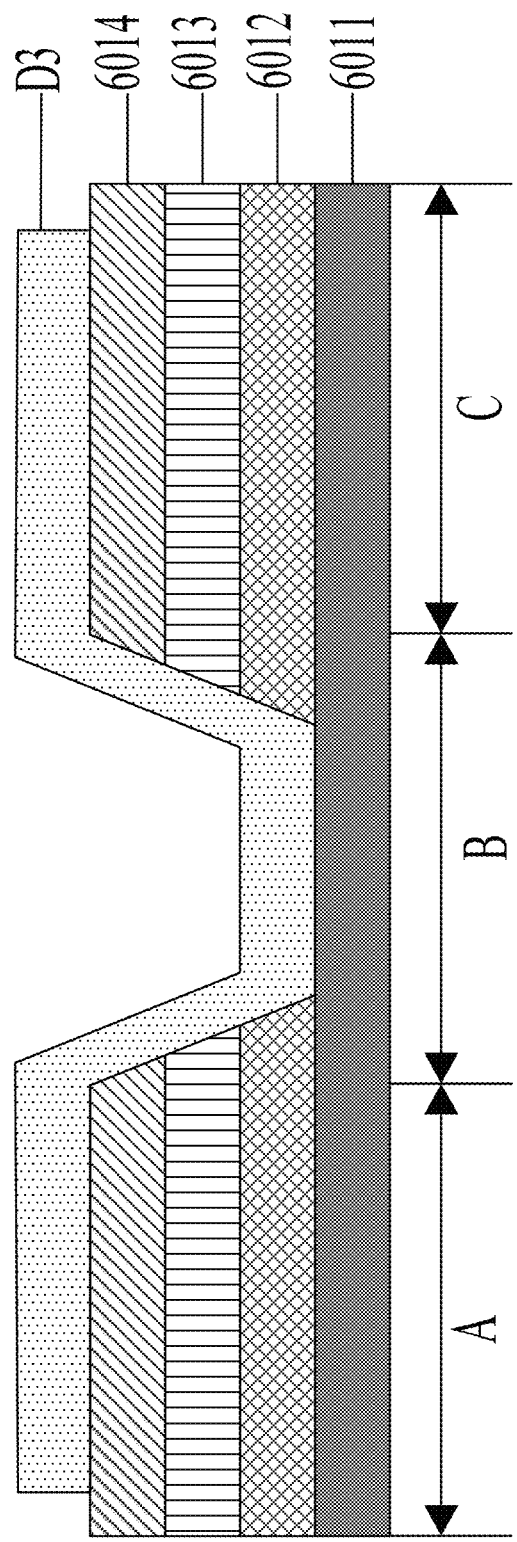
FIG. 7c is a schematic diagram of a structure of yet another connector after a conductor layer is formed according to an embodiment of the present disclosure.
Figure 7D:
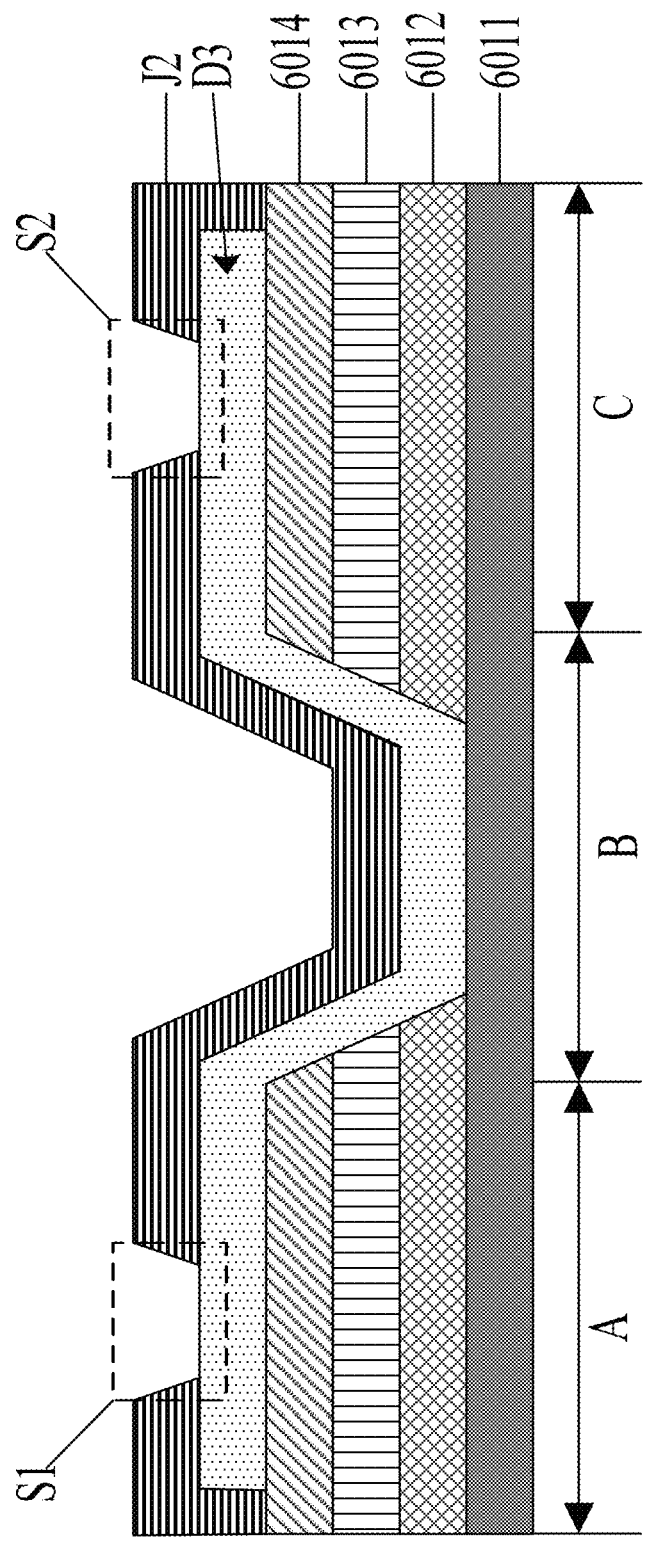
FIG. 7d is a schematic diagram of a structure of yet another connector after via holes are formed on the target insulating layer according to an embodiment of the present disclosure.
Figure 7E:
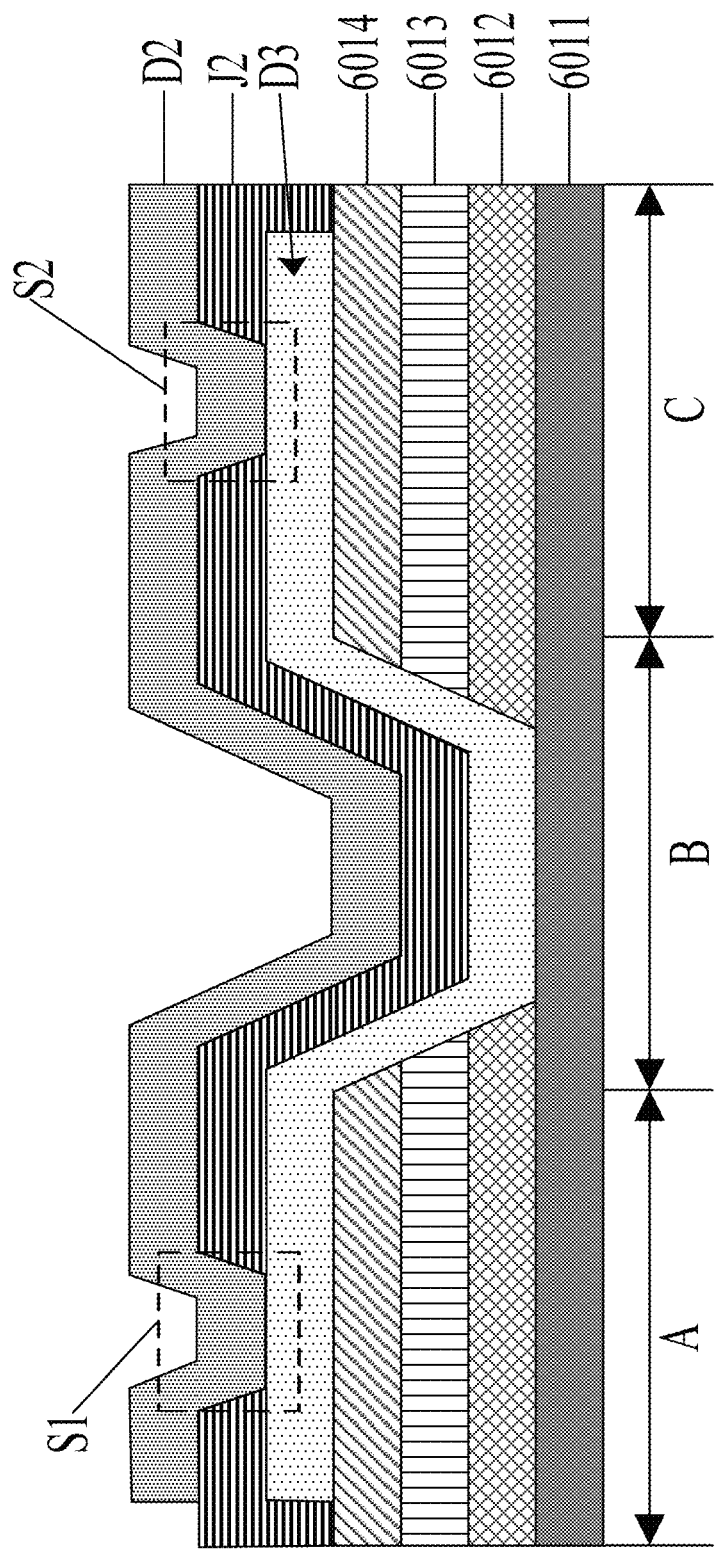
FIG. 7e is a schematic diagram of a structure of a connector after a circuit conductor layer is formed on the target insulating layer according to an embodiment of the present disclosure.
Figure 7F:
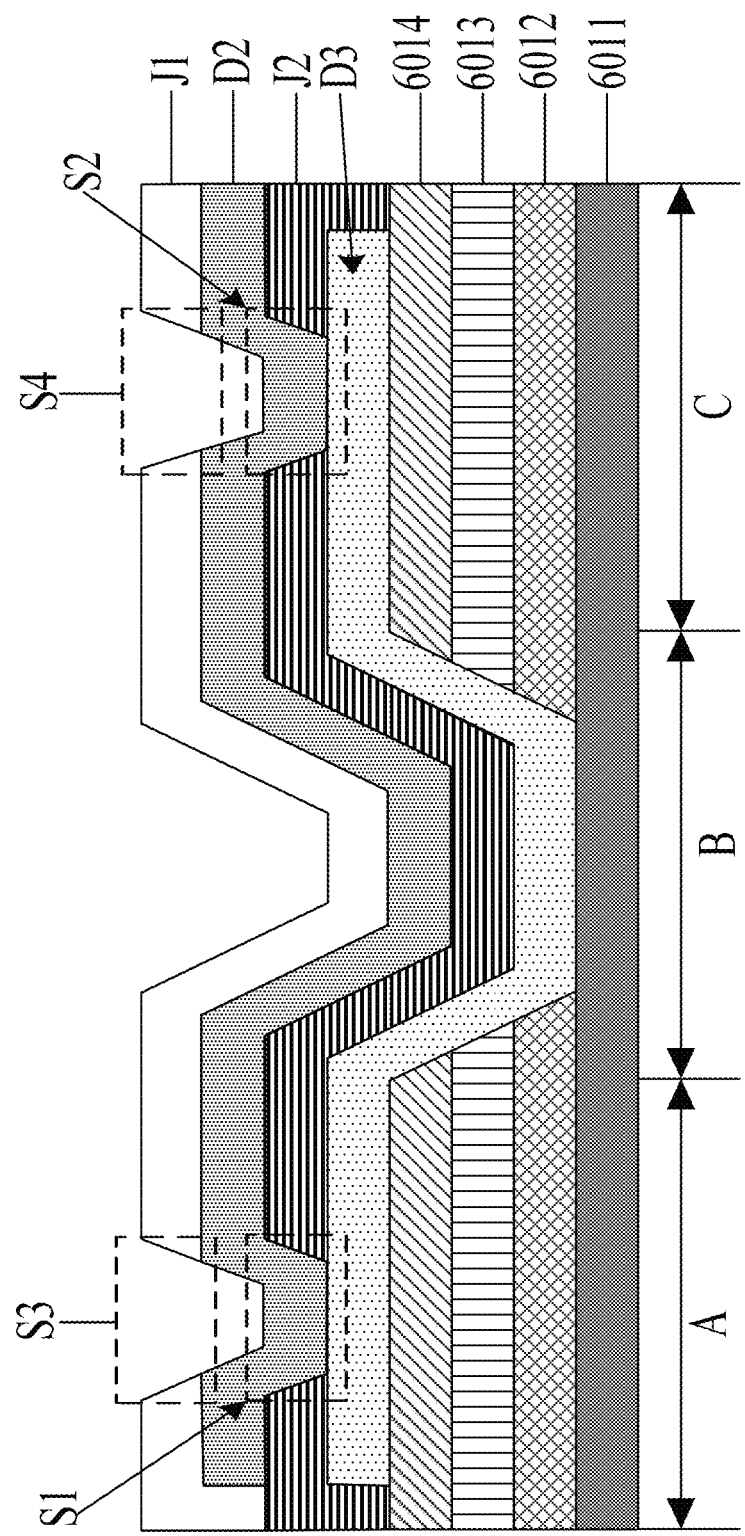
FIG. 7f is a schematic diagram of a structure of still yet another connector after via holes are formed on the target insulating layer according to an embodiment of the present disclosure.

As shown in FIG. 7b, the PI substrate 6011, the water blocking layer 6012, the buffer layer 6013 and the auxiliary insulating layer 6014 may be sequentially formed on a bearing substrate (not shown in FIG. 6b). Then, the water blocking layer 6012, the buffer layer 6013 and the auxiliary insulating layer 6014 are etched, such that a groove is formed in the substrate (including the PI substrate 6011, the water blocking layer 6012, the buffer layer 6013 and the auxiliary insulating layer 6014). Herein, the substrate may be divided into a first edge region A, a target region B and a second edge region C. The groove is located in the target region B. The PI base 6011 and the water blocking layer 6012 may be made into a single layer or multiple layers. Later, as shown FIG. 7c and FIG. 7d, the conductor layer D3 and the insulating layer J2 may continue to be sequentially formed on the auxiliary insulating layer 6014 and the groove. After the insulating layer J2 is formed, the insulating layer J2 may be etched, such that a plurality of first via holes are formed on the insulating layer J2, and therefore, the conductor layer D3 at the plurality of first via holes is exposed. It should be noted that only two (the via hole S1 and the via hole S2) of the plurality of first via holes are shown in FIG. 7d. Later, as shown in FIG. 7e and FIG. 7f, a conductor layer D2 (i.e., the circuit conductor layer) and the insulating layer J1 may be sequentially formed on the insulating layer J2. The right end of the conductor layer D2 is connected to the driver IC. In addition, the conductor layer D2 is in contact and connection with the conductor layer D3 through the plurality of first via holes on the insulating layer J2. Next, the insulating layer J1 may also be etched to form a plurality of second via holes, and the conductor layer D2 is exposed through the plurality of second via holes. It should be noted that only two (the via hole S3 and the via hole S4) of the plurality of second via holes are shown in FIG. 7e. Then, as shown in FIG. 7a, a conductor layer D1 (i.e., the data conductor layer) may continue to be formed on the insulating layer J1. The left end of the conductor layer D1 is connected to the data signal line in the display panel. In addition, the conductor layer D1 is in contact and connection with the conductor layer D2 through the plurality of second via holes. Finally, the bearing substrate may be stripped to obtain the connector as shown in FIG. 7a.

Figure 8A:
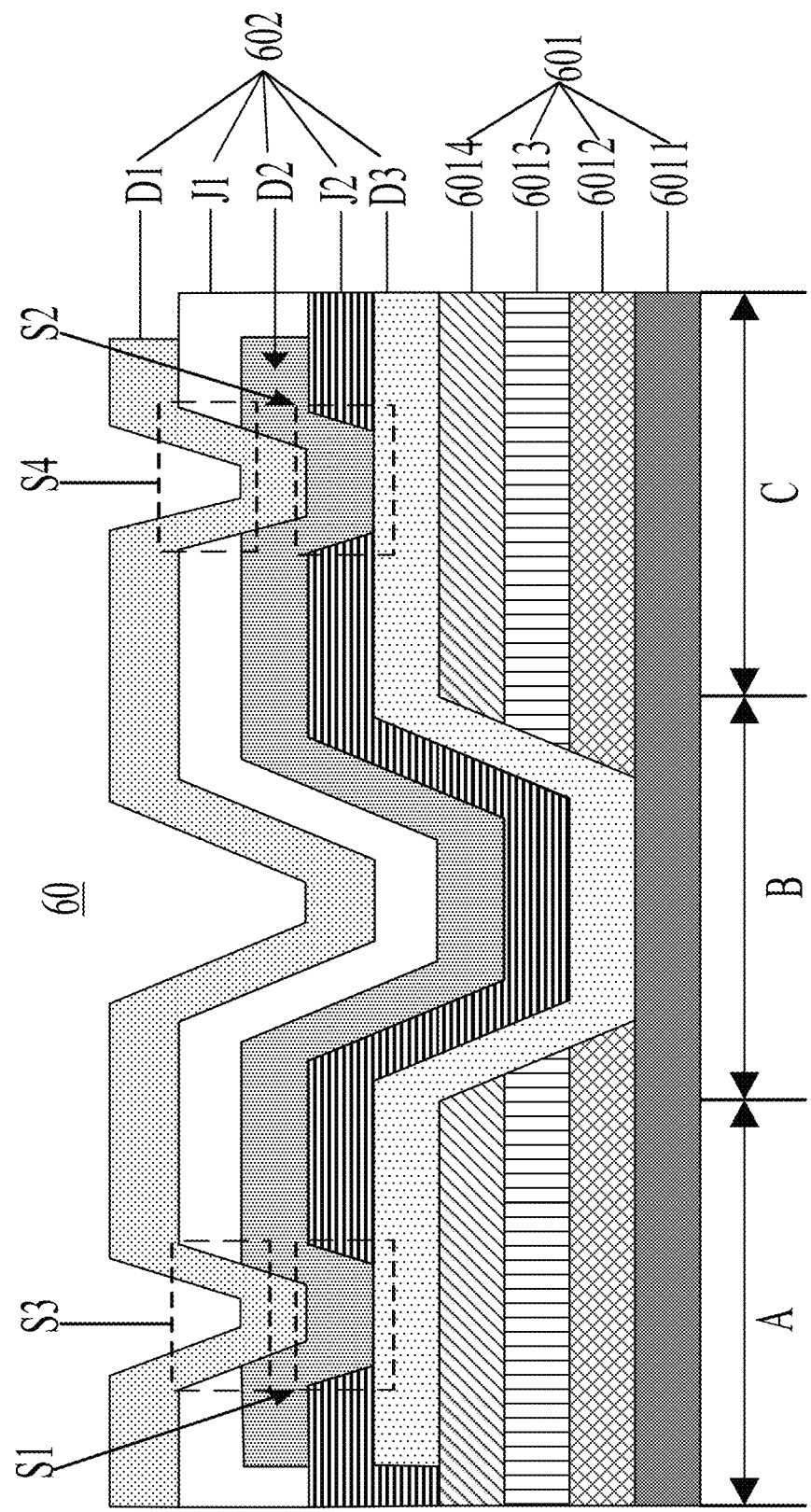
FIG. 8a is a schematic diagram of a structure of another connector according to another embodiment of the present disclosure.

In the fourth implementation manner, referring to FIG. 8a, m=3, n=2. That is, the conductor structure 602 includes three conductor layers (the conductor layer D1, the conductor layer D2 and the conductor layer D3) arranged on the substrate 601 and two target insulating layers (the insulating layer J1 and the insulating layer J2) also arranged on the substrate 601. The conductor layer D1 may be the third conductor layer close to the substrate 601. The conductor layer D2 may be the second conductor layer close to the substrate 601. The conductor layer D3 may be the first conductor layer, close to the substrate 601, of the three conductor layers. The two insulating layers and the three conductor layers are alternately arranged. Exemplarily, the insulating layer J1 is arranged between the conductor layer D1 and the conductor layer D2. The insulating layer J2 is arranged between the conductor layer D2 and the conductor layer D3. Herein, the conductor layer D1 is the data conductor layer, and the conductor layer D3 is the circuit conductor layer. That is, the left end of the conductor layer D1 is connected to the data signal line in the display panel, and the right end of the conductor layer D3 is connected to the driver IC. The structure of the substrate may refer to the structure of the substrate in the first implementation manner of the connector, which is not described repeatedly in the embodiments of the present disclosure.

Exemplarily, a manufacturing process of the connector in the fourth implementation manner refers to FIGS. 8a to 8f.

Figure 8B:
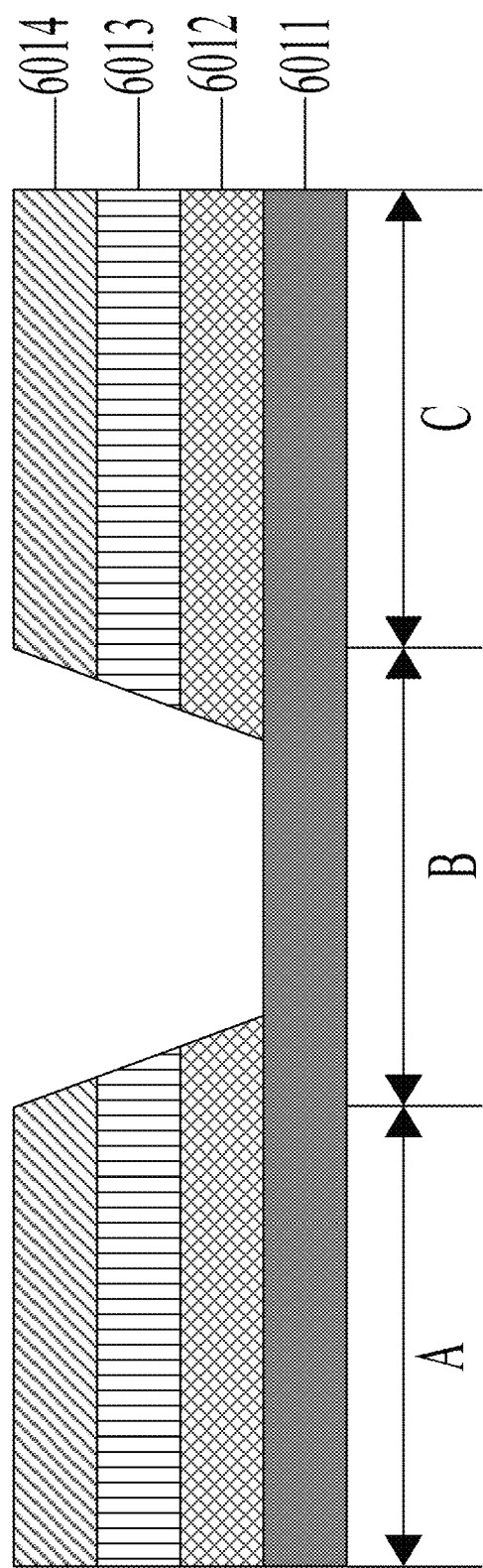
FIG. 8b is a schematic diagram of a structure of still yet another a base according to an embodiment of the present disclosure.
Figure 8C:
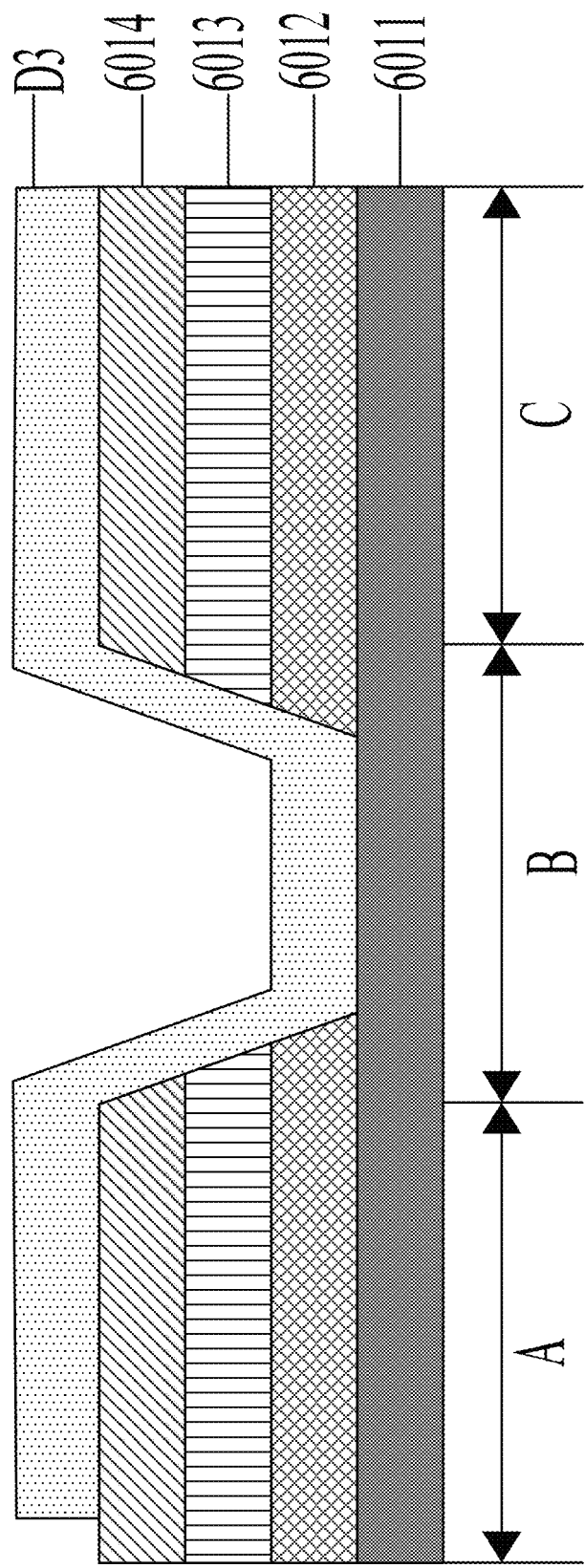
FIG. 8c is a schematic diagram of a structure of another connector after a circuit conductor layer is formed according to an embodiment of the present disclosure.
Figure 8D:
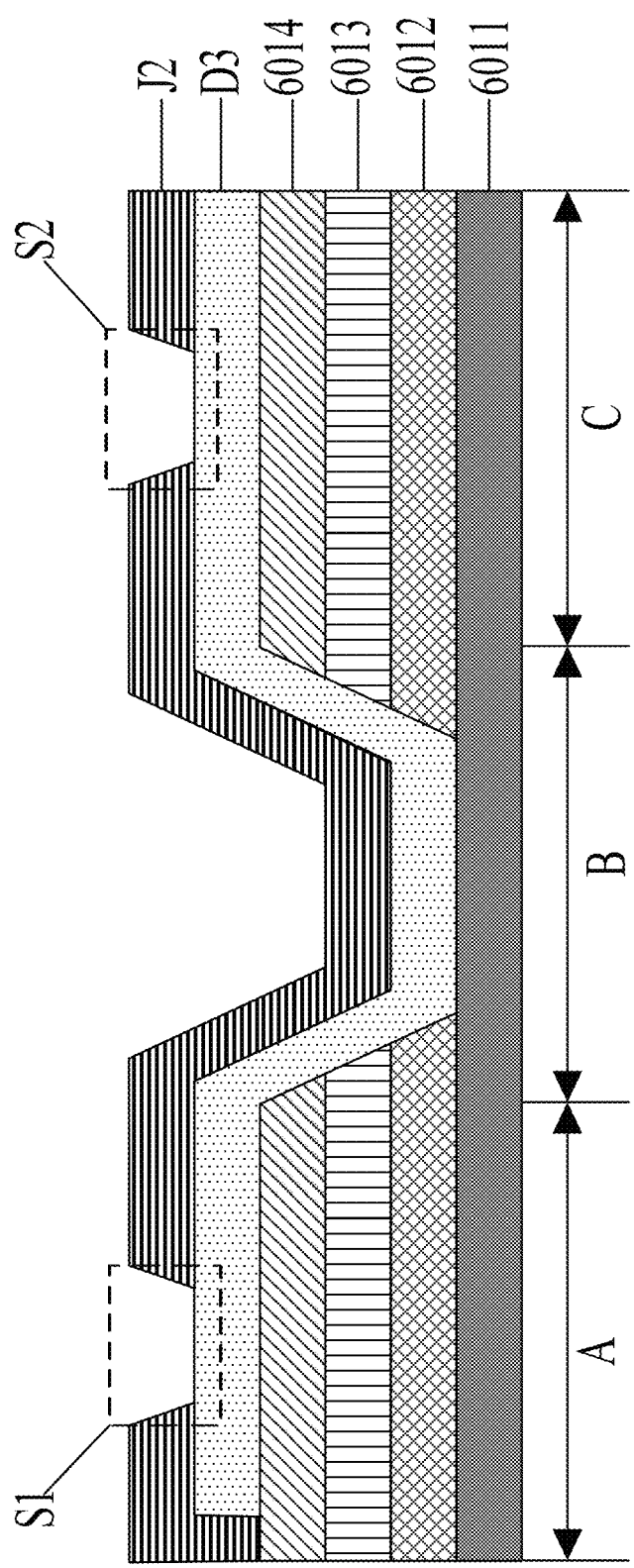
FIG. 8d is a schematic diagram of a structure of still yet another connector after via holes are formed on the target insulating layer according to an embodiment of the present disclosure.
Figure 8E:
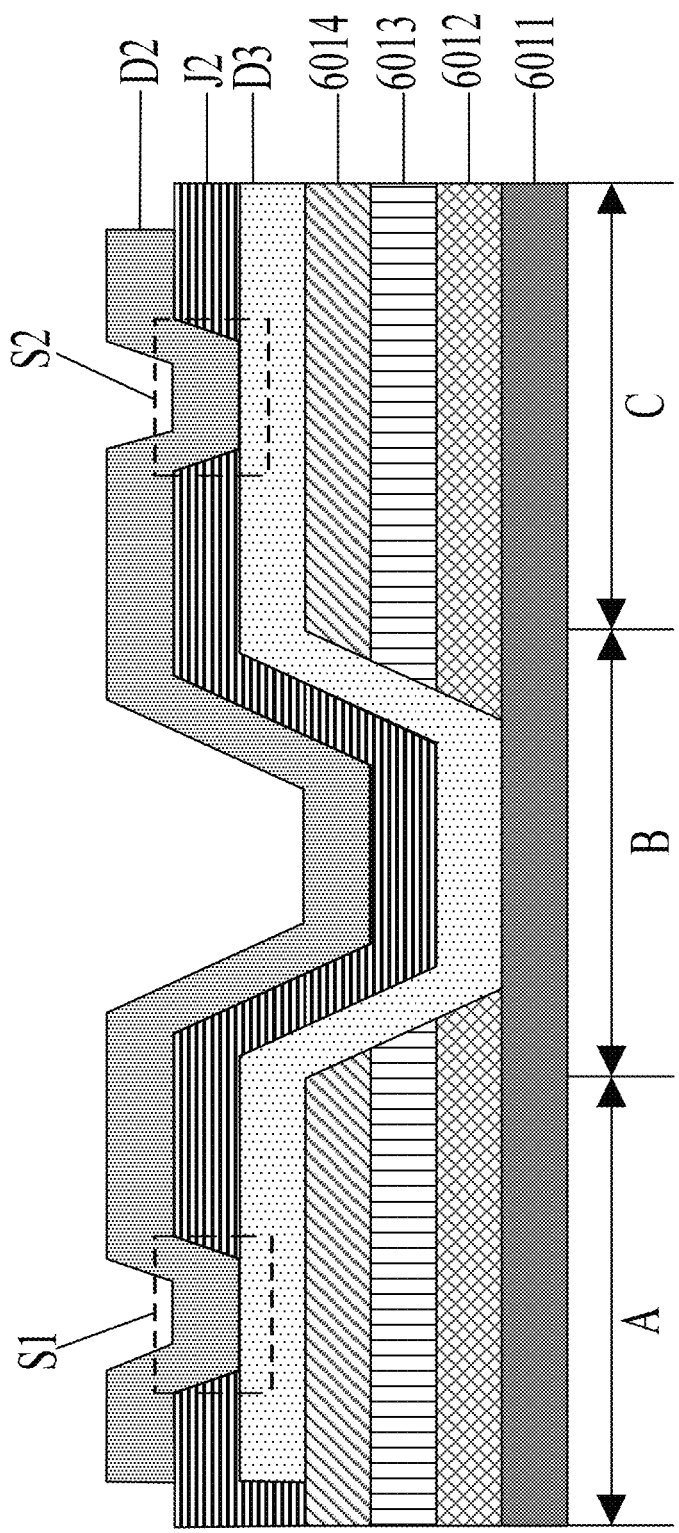
FIG. 8e is a schematic diagram of a structure of another connector after a circuit conductor layer is formed on the target insulating layer according to an embodiment of the present disclosure.
Figure 8F:
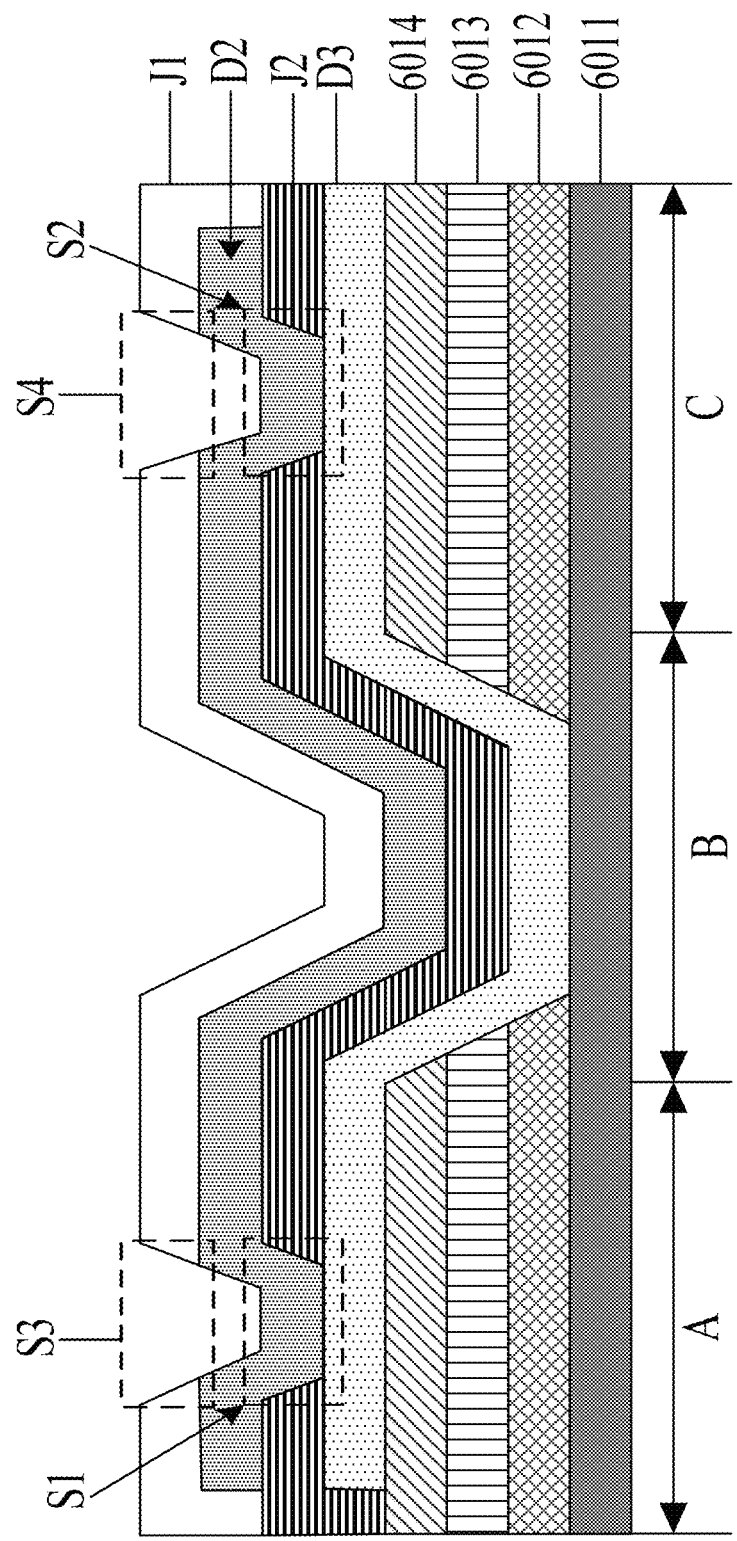
FIG. 8f is a schematic diagram of a structure of a connector after via holes are formed on the target insulating layer according to an embodiment of the present disclosure.

As shown in FIG. 8b, the PI substrate 6011, the water blocking layer 6012, the buffer layer 6013 and the auxiliary insulating layer 6014 may be sequentially formed on a bearing substrate (not shown in FIG. 8b) first. The PI substrate 6011 and the water blocking layer 6012 may be made into a single layer or multiple layers. After the auxiliary insulating layer 6014 is manufactured, the water blocking layer 6012, the buffer layer 6013 and the auxiliary insulating layer 6014 may be etched, such that a groove is formed in the substrate (including the PI substrate 6011, the water blocking layer 6012, the buffer layer 6013 and the auxiliary insulating layer 6014). The substrate may be divided into a first edge region A, a target region B and a second edge region C, where the groove is located in the target region B. Later, as shown in FIG. 8c and FIG. 8d, the conductor layer D3 (i.e., the circuit conductor layer) and the insulating layer J2 may continue to be sequentially formed on the auxiliary insulating layer 6014 and the groove, such that the right end of the conductor layer D3 is connected to the driver IC. After the insulating layer J2 is formed, the insulating layer J2 may be etched, such that a plurality of first via holes is formed in the insulating layer J2, and therefore, the conductor layer D3 at the plurality of first via holes is exposed. It should be noted that only two (the via hole S1 and the via hole S2) of the plurality of first via holes are shown in FIG. 8d. Later, as shown in FIG. 8e and FIG. 8f, the conductor layer D2 and the insulating layer J1 may be sequentially formed on the insulating layer J2. The conductor layer D2 may be in contact and connection with the conductor layer D3 through the plurality of first via holes. Next, the insulating layer J1 may also be etched to form a plurality of second via holes, and the conductor layer D2 is exposed through the plurality of second via holes. It should be noted that only two (the via hole S3 and the via hole S4) of the plurality of second via holes are shown in FIG. 8e. Then, as shown in FIG. 8a, a conductor layer D1 (i.e., the data conductor layer) may continue to be formed on the insulating layer J1. The left end of the conductor layer D1 is connected to the data signal line in the display panel. In addition, the conductor layer D1 is in contact and connection with the conductor layer D2 through the plurality of second via holes. Finally, the bearing substrate may be stripped to obtain the connector as shown in FIG. 8a.

Figure 9A:
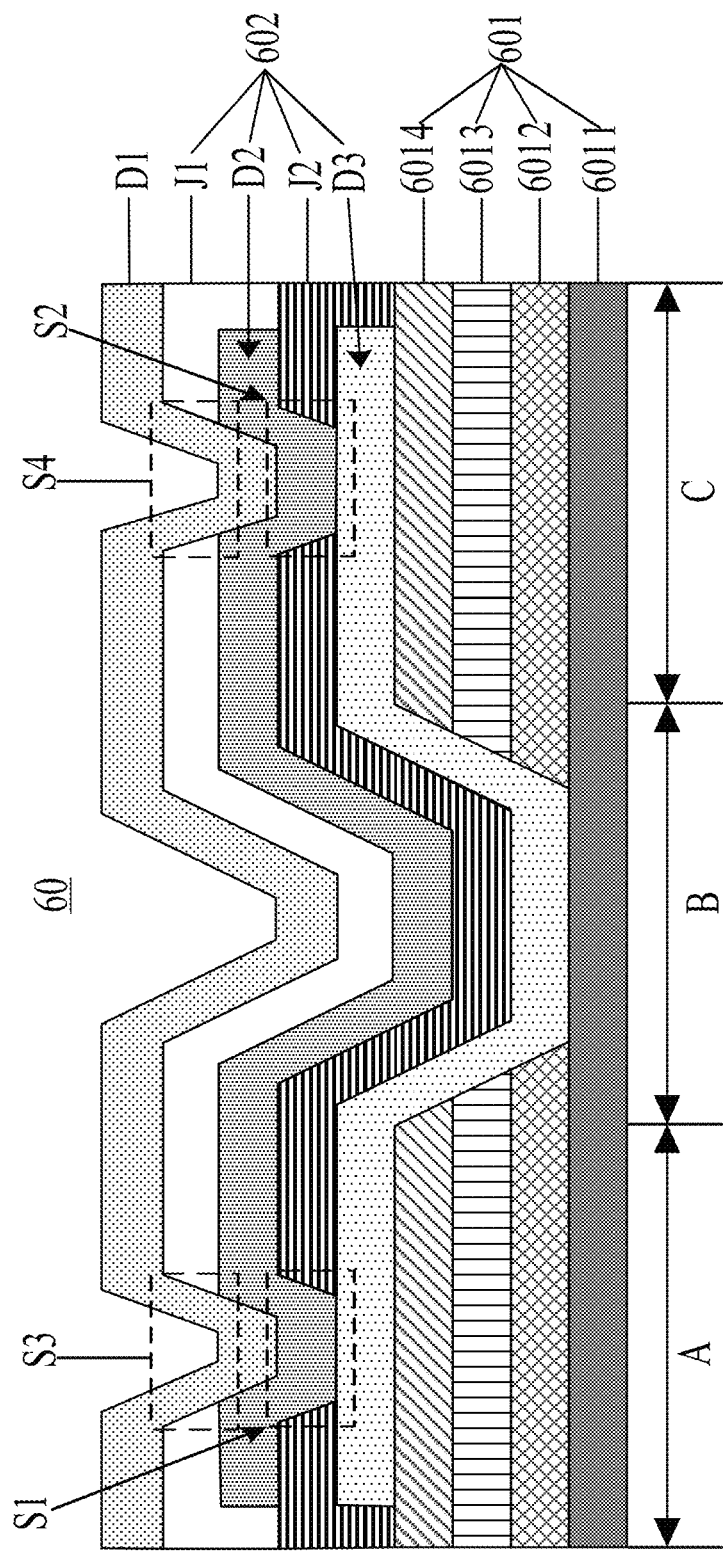
FIG. 9a is a schematic diagram of a structure of yet another connector according to yet another embodiment of the present disclosure.

In the fifth implementation manner, referring to FIG. 9a, m=3, n=2. That is, the conductor structure 602 includes three conductor layers (the conductor layer D1, the conductor layer D2 and the conductor layer D3) arranged on the substrate 601 and two target insulating layers (the insulating layer J1 and the insulating layer J2) also arranged on the substrate 601. The conductor layer D1 may be the third conductor layer close to the substrate 601. The conductor layer D2 may be the second conductor layer close to the substrate 601. The conductor layer D3 may be the first conductor layer, close to the substrate 601, of the three conductor layers. The two insulating layers and the three conductor layers are alternately arranged. Exemplarily, the insulating layer J1 is arranged between the conductor layer D1 and the conductor layer D2. The insulating layer J2 is arranged between the conductor layer D2 and the conductor layer D3. Herein, the conductor layer D1 serves as the data conductor layer and the circuit conductor layer at the same time. That is, the left end of the conductor layer D1 is connected to the data signal line in the display panel, and the right end of the conductor layer D1 is connected to the driver IC. The structure of the substrate may refer to the structure of the substrate in the first implementation manner of the connector, which is not described repeatedly in the embodiments of the present disclosure.

Exemplarily, a manufacturing process of the connector in the fifth implementation manner refers to FIGS. 9a to 9f.

Figure 9B:
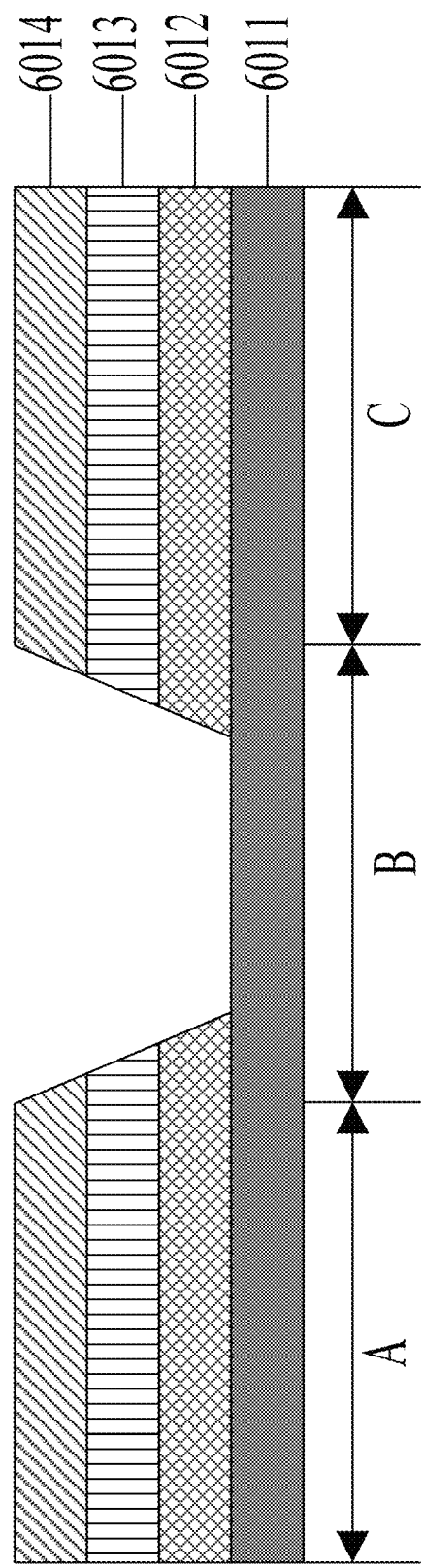
FIG. 9b is a schematic diagram of a structure of a base according to yet another embodiment of the present disclosure.
Figure 9C:
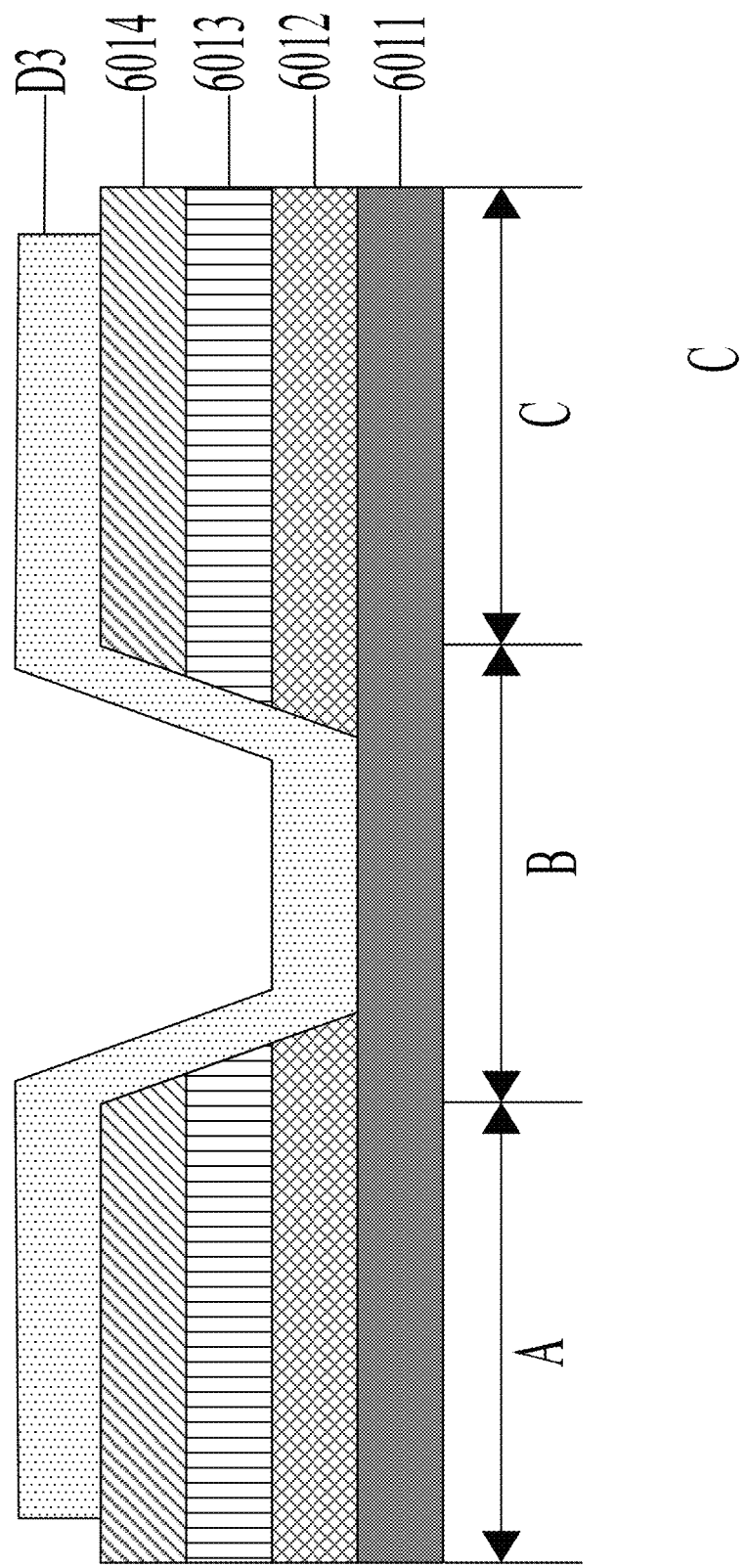
FIG. 9c is a schematic diagram of a structure of still another connector after a conductor layer is formed according to an embodiment of the present disclosure.
Figure 9D:
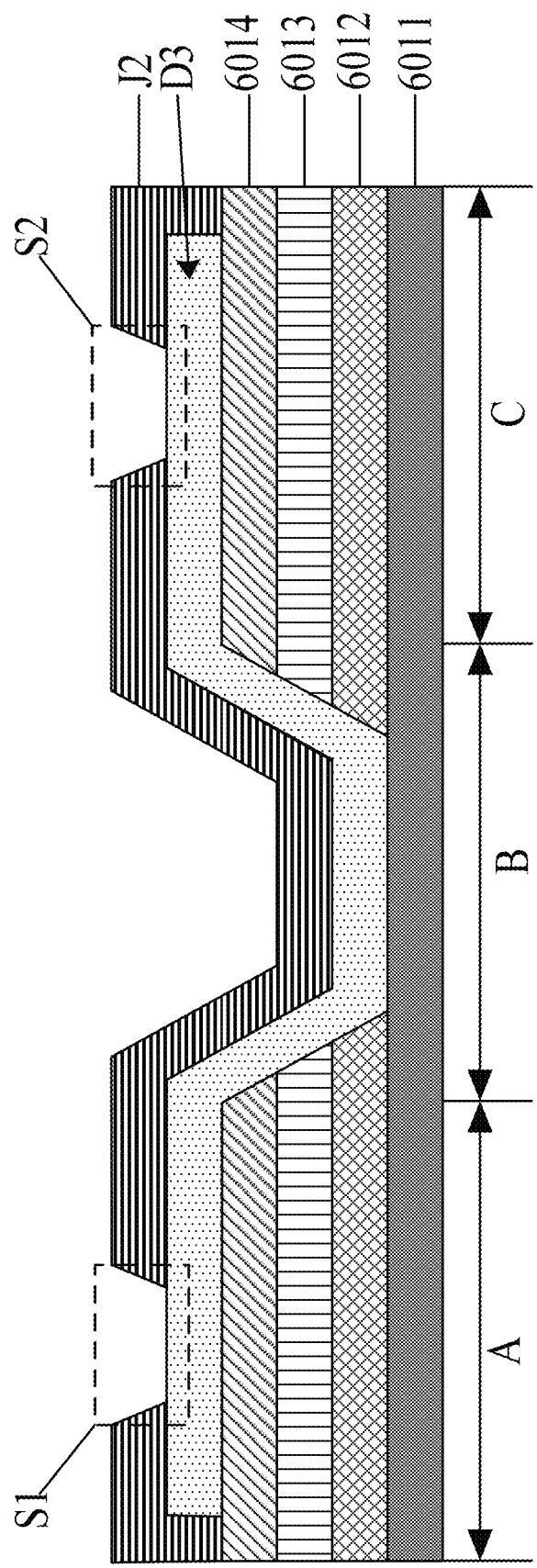
FIG. 9d is a schematic diagram of a structure of a connector after via holes are formed on the target insulating layer according to another embodiment of the present disclosure.
Figure 9E:
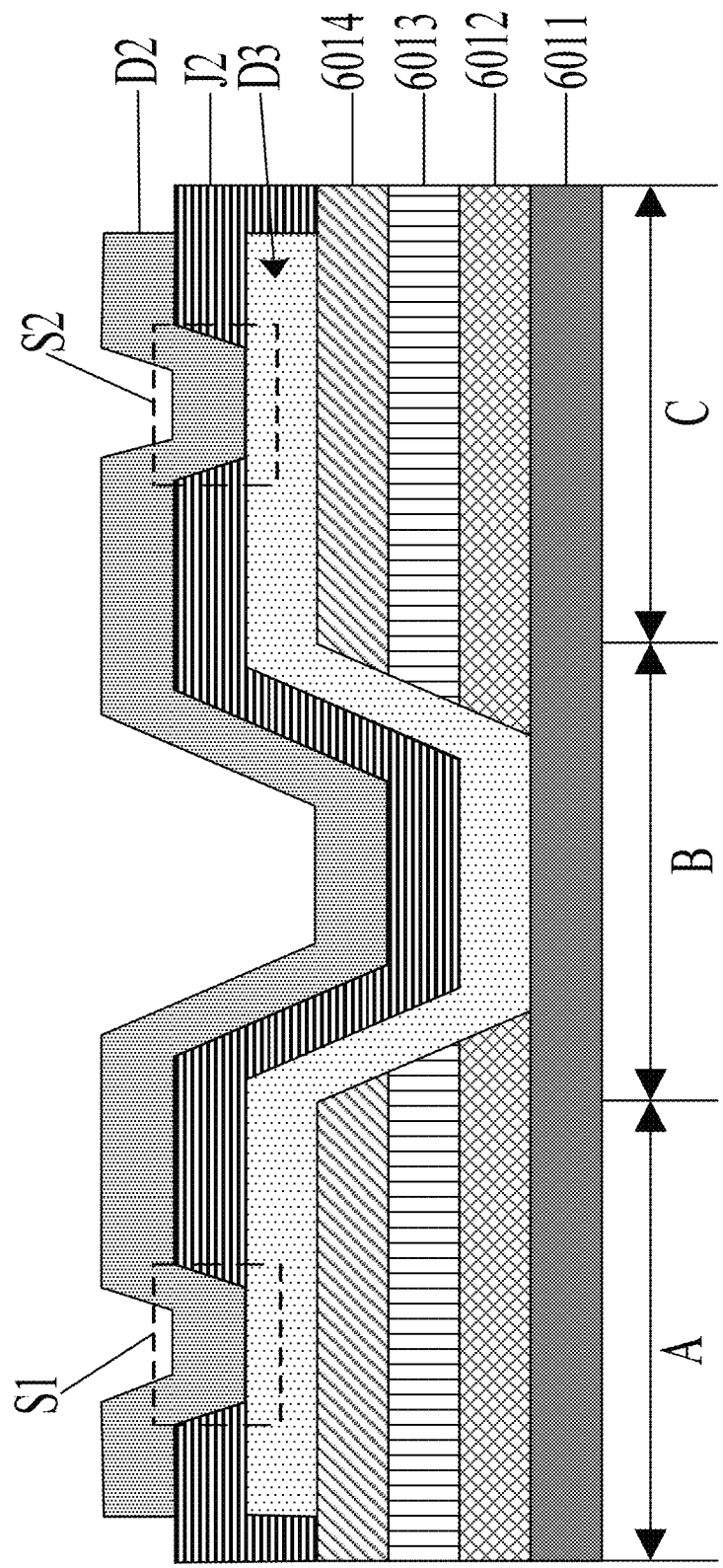
FIG. 9e is a schematic diagram of a structure of yet another connector after via holes are formed on the target insulating layer according to an embodiment of the present disclosure.
Figure 9F:
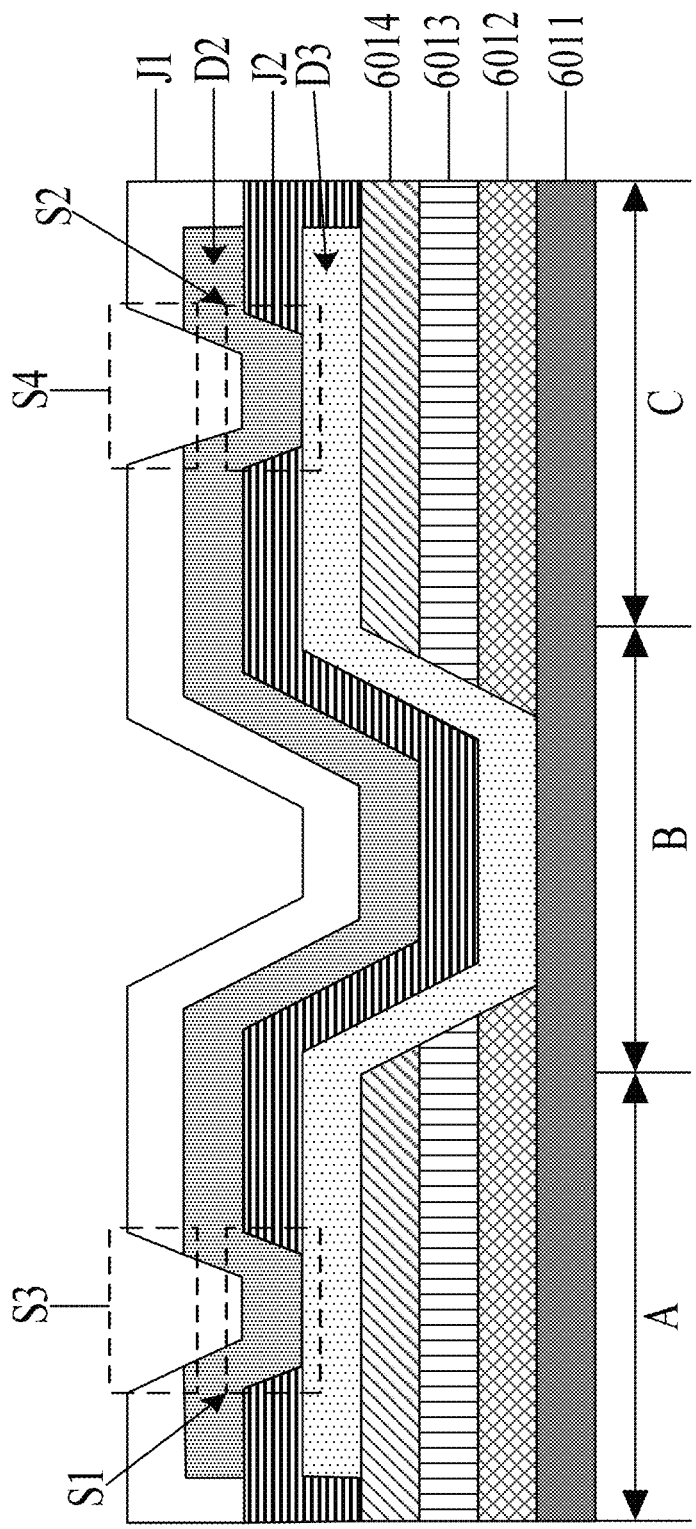
FIG. 9f is a schematic diagram of a structure of another connector after via holes are formed on the target insulating layer according to another embodiment of the present disclosure.

As shown in FIG. 9b, the PI substrate 6011, the water blocking layer 6012, the buffer layer 6013 and the auxiliary insulating layer 6014 may be sequentially formed on a bearing substrate (not shown in FIG. 9b). The PI substrate 6011 and the water blocking layer 6012 may be made into a single layer or multiple layers. After the auxiliary insulating layer 6014 is manufactured, the water blocking layer 6012, the buffer layer 6013 and the auxiliary insulating layer 6014 may be etched, such that a groove is formed in the substrate (including the PI substrate 6011, the water blocking layer 6012, the buffer layer 6013 and the auxiliary insulating layer 6014). Herein, the substrate may be divided into a first edge region A, a target region B and a second edge region C, where the groove is located in the target region B. Later, as shown FIG. 9c and FIG. 9d, the conductor layer D3 and the insulating layer J2 may continue to be sequentially formed on the auxiliary insulating layer 6014 and the groove. After the insulating layer J2 is formed, the insulating layer J2 may be etched, such that a plurality of first via holes are formed on the insulating layer J2, and therefore, the conductor layer D3 at the plurality of first via holes is exposed. It should be noted that only two (the via hole S1 and the via hole S2) of the plurality of first via holes are shown in FIG. 9d. Later, as shown in FIG. 9e and FIG. 9f, the conductor layer D2 and the insulating layer J1 may be sequentially formed on the insulating layer J2. The conductor layer D2 may be in contact and connection with the conductor layer D3 through the plurality of first via holes. Next, the insulating layer J1 may also be etched to form a plurality of second via holes, and the conductor layer D2 is exposed through the plurality of second via holes. It should be noted that only two (the via hole S3 and the via hole S4) of the plurality of second via holes are shown in FIG. 9e. Then, as shown in FIG. 9a, a conductor layer D1 (i.e., the data conductor layer or the circuit conductor layer) may be formed on the insulating layer J1. The left end of the conductor layer D1 is connected to the data signal line in the display panel. The right end of the conductor layer D1 is connected to the driver IC. In addition, the conductor layer D1 is in contact and connection with the conductor layer D2 at the plurality of second via holes. Finally, the bearing substrate may be stripped to obtain the connector as shown in FIG. 9a.

Figure 10A:
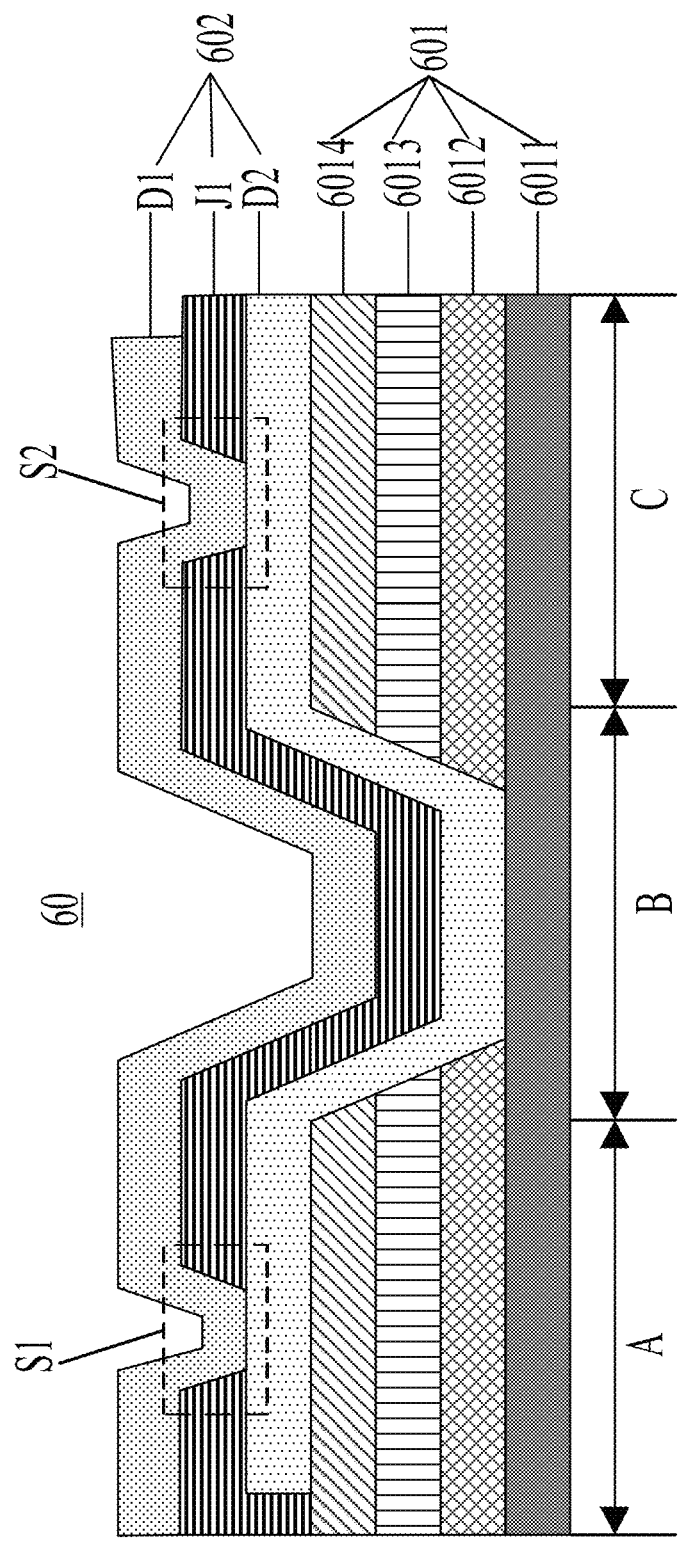
FIG. 10a is a schematic diagram of a structure of yet another connector according to yet another embodiment of the present disclosure.

In the sixth implementation manner, referring to FIG. 10a, m=2, n=1. That is, the conductor structure 602 includes two conductor layers (the conductor layer D1 and the conductor layer D2) arranged on the substrate 601 and one target insulating layer (the insulating layer J1) also arranged on the substrate 601. The conductor layer D1 may be the second conductor layer close to the substrate 601. The conductor layer D2 may be the first conductor layer, close to the substrate 601, of the two conductor layers. The insulating layer J1 may be arranged between the conductor layer D1 and the conductor layer D2. Herein, the conductor layer D1 is the data conductor layer, and the conductor layer D2 is the circuit conductor layer. That is, the left end of the conductor layer D1 is connected to the data signal line in the display panel, and the right end of the conductor layer D2 is connected to the driver IC. The structure of the substrate 601 may refer to the structure of the substrate in the first implementation manner of the connector, which is not described repeatedly in the embodiments of the present disclosure.

Exemplarily, a manufacturing process of the connector in the sixth implementation manner refers to FIGS. 10a to 10e.

Figure 10B:
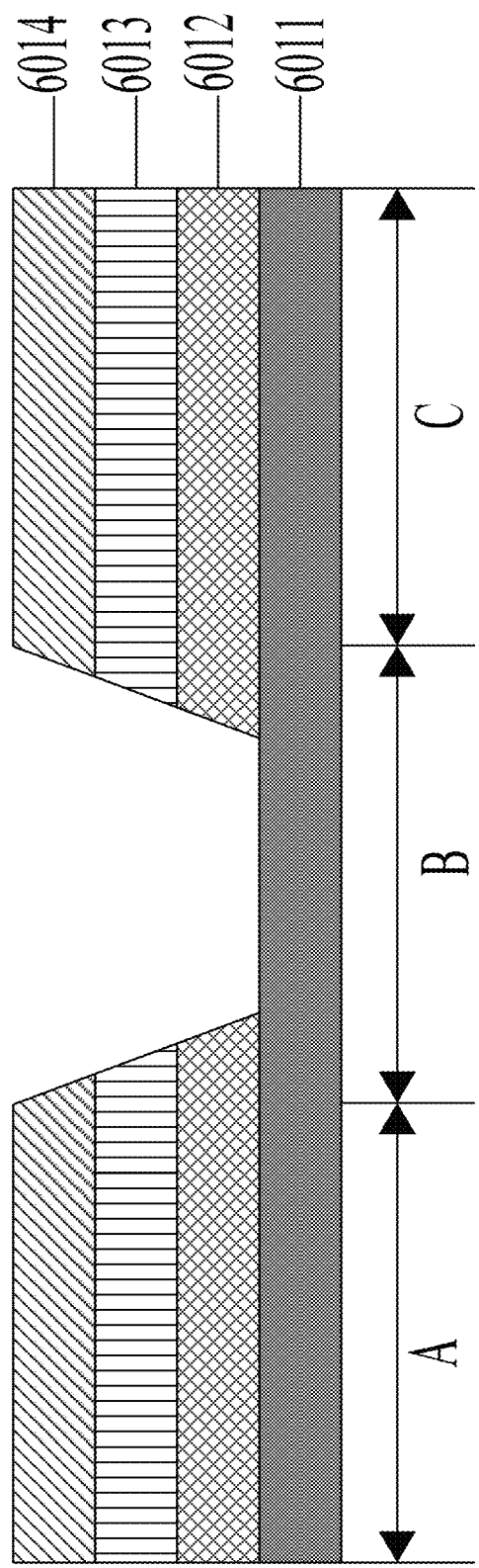
FIG. 10b is a schematic diagram of a structure of another a base according to another embodiment of the present disclosure.
Figure 10C:
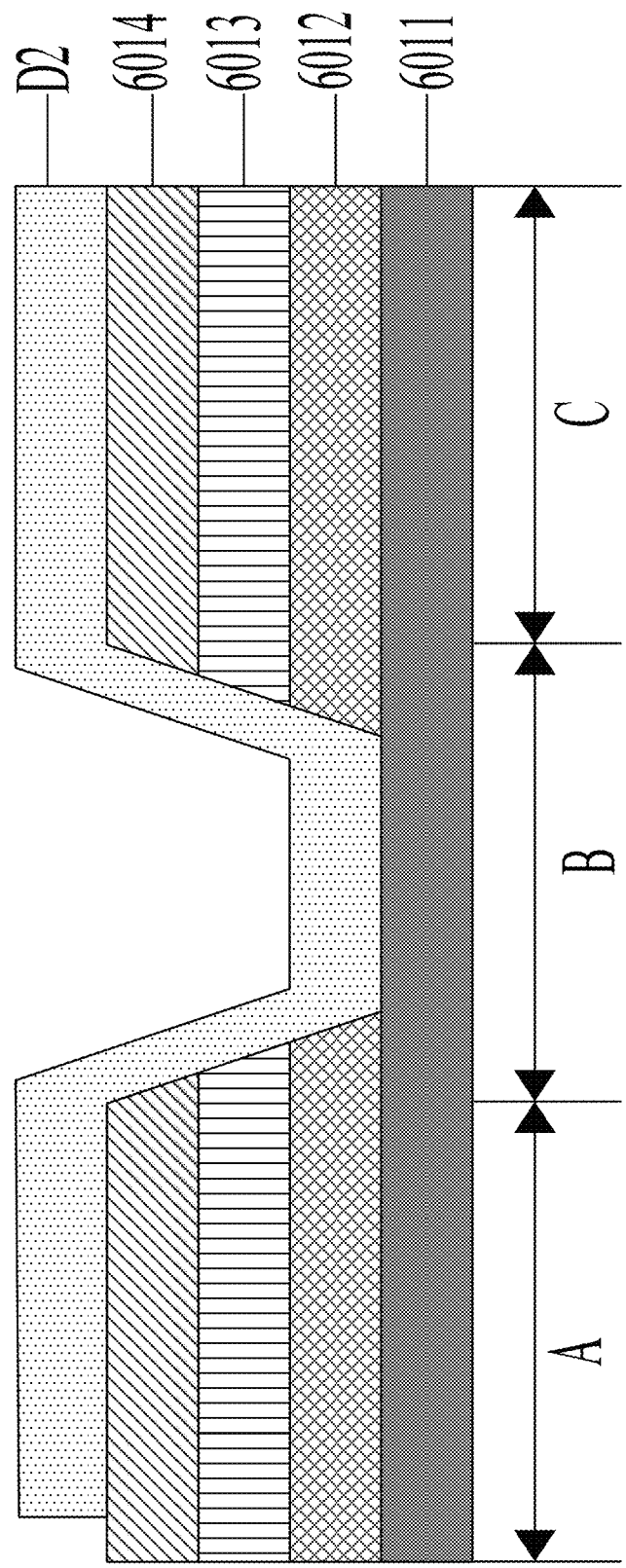
FIG. 10c is a schematic diagram of a structure of yet another connector after a circuit conductor layer is formed according to an embodiment of the present disclosure.
Figure 10D:
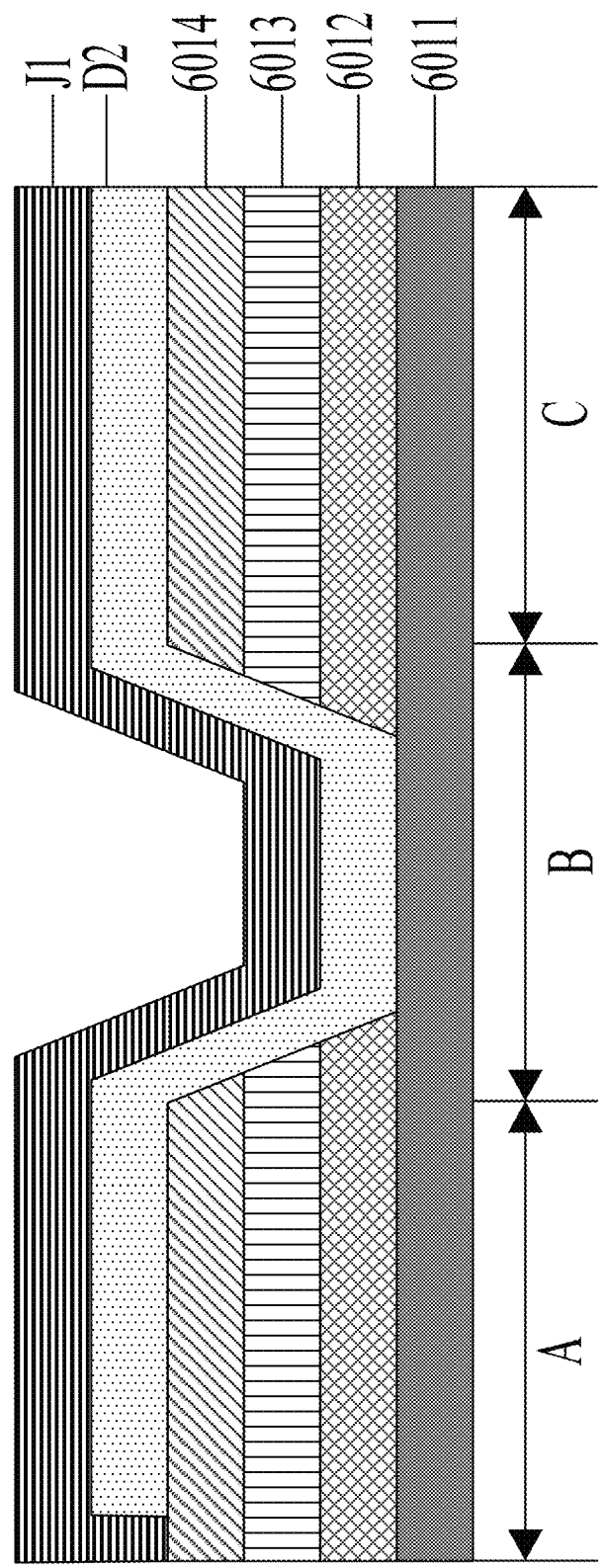
FIG. 10d is a schematic diagram of a structure of yet another connector after a target insulating layer is formed according to an embodiment of the present disclosure.
Figure 10E:
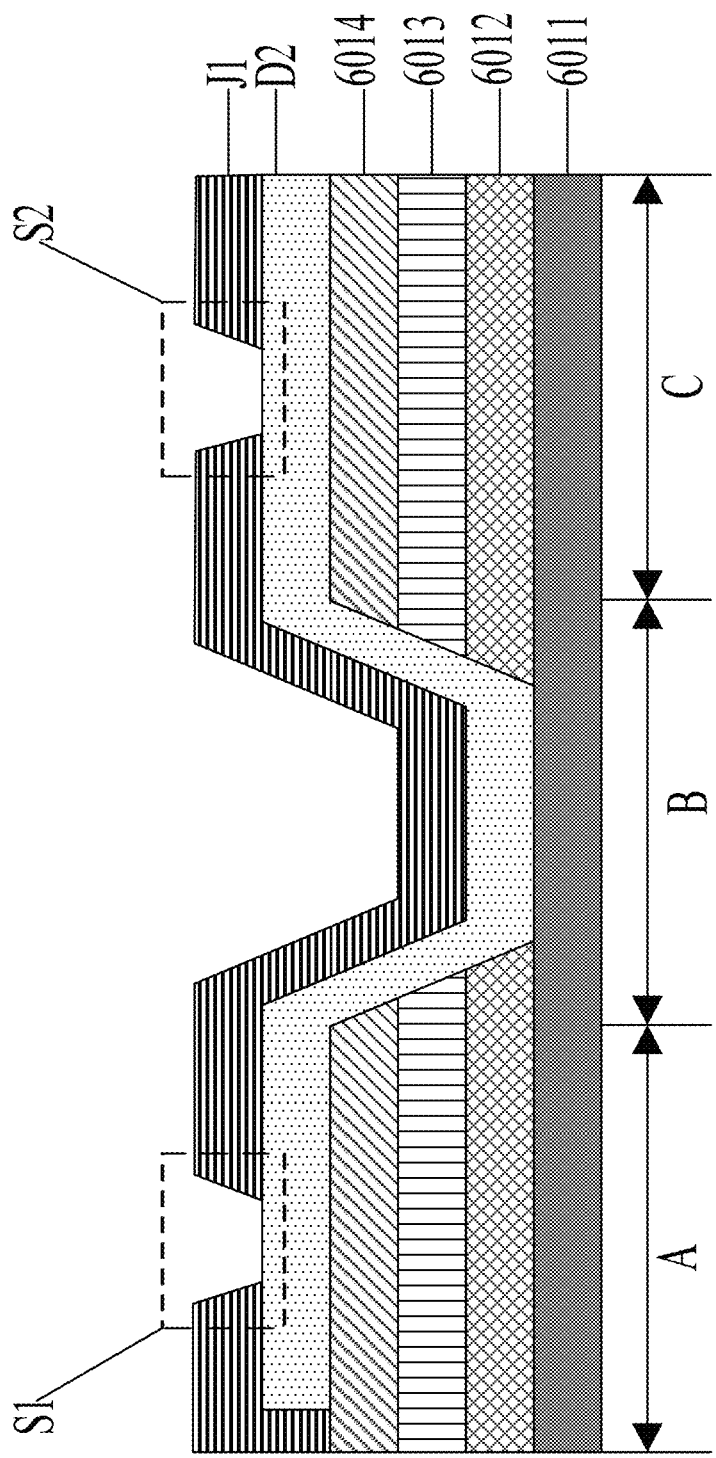
FIG. 10e is a schematic diagram of a structure of yet another connector after via holes are formed on the target insulating layer according to another embodiment of the present disclosure.

As shown in FIG. 10b, in the course of manufacturing the connector, first, the PI substrate 6011, the water blocking layer 6012, the buffer layer 6013 and the auxiliary insulating layer 6014 may be sequentially formed on a bearing substrate (not shown in FIG. 10b). Then, the water blocking layer 6012, the buffer layer 6013 and the auxiliary insulating layer 6014 are etched, such that a groove is formed in the substrate (including the PI substrate 6011, the water blocking layer 6012, the buffer layer 6013 and the auxiliary insulating layer 6014). Herein, the substrate may be divided into a first edge region A, a target region B and a second edge region C, wherein the groove is located in the target region B. The PI base 6011 and the water blocking layer 6012 may be made into a single layer or multiple layers. Later, as shown in FIG. 10c and FIG. 10d, the conductor layer D2 (i.e., the circuit conductor layer) and the insulating layer J1 may continue to be sequentially formed on the auxiliary insulating layer 6014 and the groove, such that the right end of the conductor layer D2 is connected to the driver IC. As shown in FIG. 10e, after the insulating layer J1 is formed, the insulating layer J1 may be etched, such that a plurality of via holes is formed in the insulating layer J1, and therefore, the conductor layer D2 at the plurality of via holes is exposed. It should be noted that only two (the via hole S1 and the via hole S2) of the plurality of via holes are shown in FIG. 10e. Then, as shown in FIG. 10a, a conductor layer D1 (i.e., the data conductor layer) may be formed on the insulating layer J1. The left end of the conductor layer D1 is connected to the data signal line in the display panel. In addition, the conductor layer D1 is in contact and connection with the conductor layer D2 through the plurality of via holes. Finally, the bearing substrate may be stripped to obtain the connector as shown in FIG. 10a.

Figure 11A:
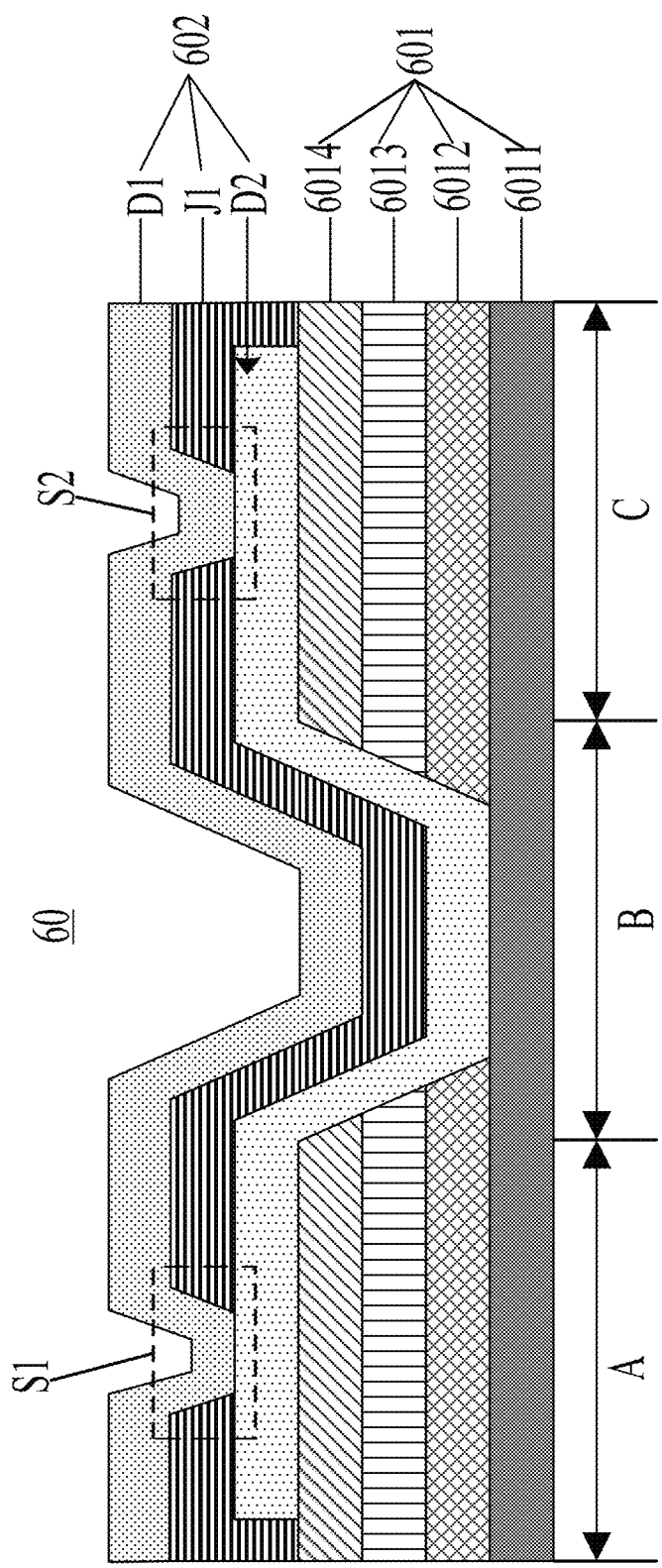
FIG. 11a is a schematic diagram of a structure of a connector according to yet another embodiment of the present disclosure.

In the seventh implementation manner, referring to FIG. 11a, m=2, n=1. That is, the conductor structure 602 includes two conductor layers (the conductor layer D1 and the conductor layer D2) arranged on the substrate 601 and one target insulating layer (the insulating layer J1) also arranged on the substrate 601. The conductor layer D1 may be the second conductor layer close to the substrate 601. The conductor layer D2 may be the first conductor layer, close to the substrate 601, of the two conductor layers. The insulating layer J1 may be arranged between the conductor layer D1 and the conductor layer D2. Herein, the conductor layer D1 serves as the data conductor layer and the circuit conductor layer at the same time. That is, the left end of the conductor layer D1 is connected to the data signal line in the display panel, and the right end of the conductor layer D1 is connected to the driver IC. The structure of the substrate 601 may refer to the structure of the substrate in the first implementation manner of the connector, which is not described repeatedly in the embodiment of the present disclosure.

Exemplarily, a manufacturing process of the connector in the seventh implementation manner refers to FIGS. 11a to 11e.

Figure 11B:
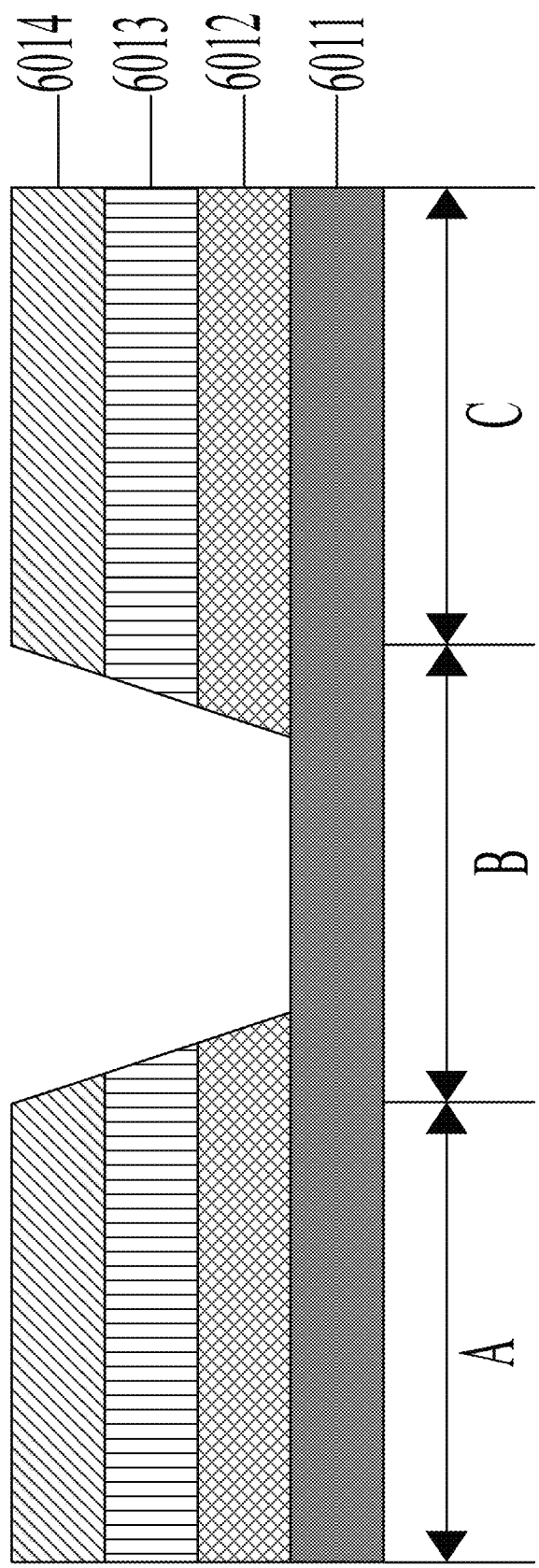
FIG. 11b is a schematic diagram of a structure of yet another base according to yet another embodiment of the present disclosure.
Figure 11C:
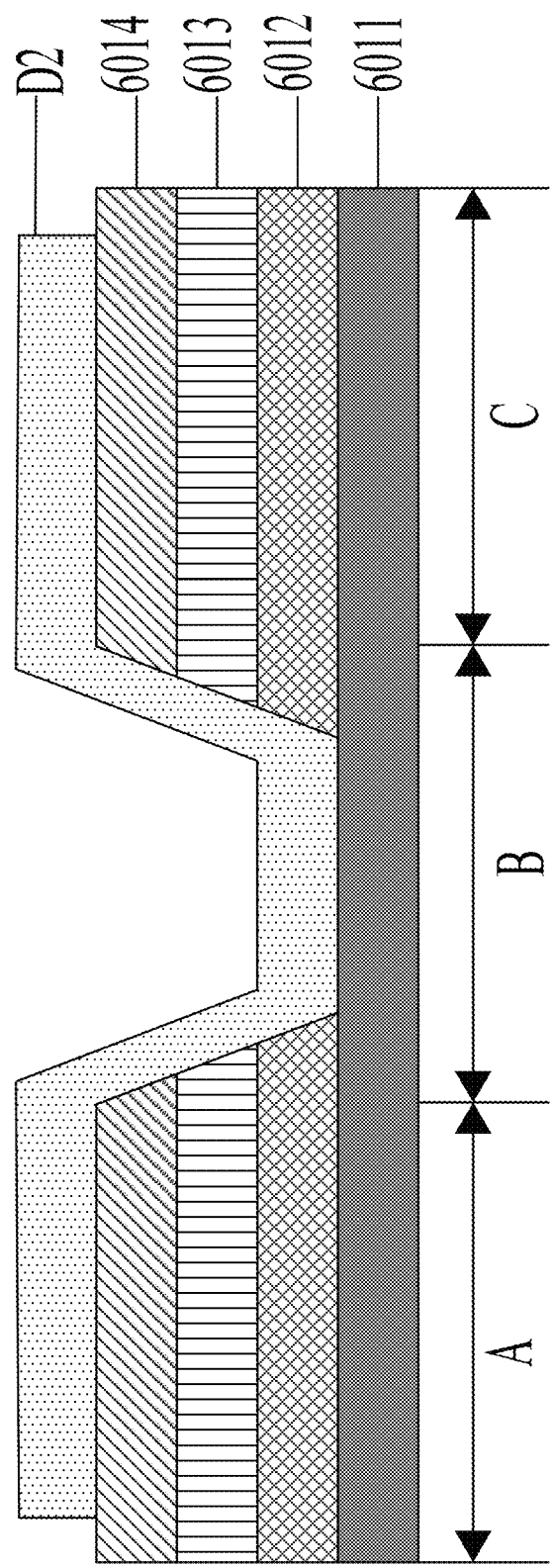
FIG. 11c is a schematic diagram of a structure of still another connector after a conductor layer is formed according to an embodiment of the present disclosure.
Figure 11D:
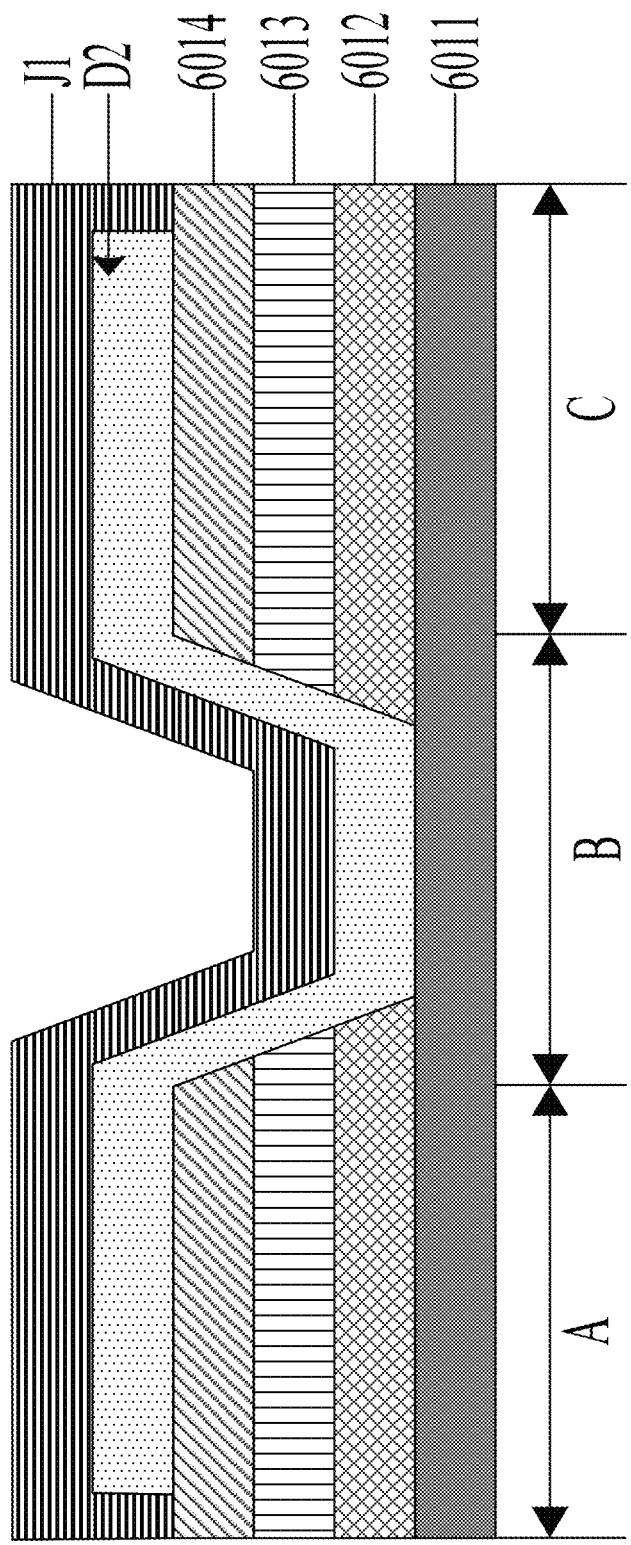
FIG. 11d is a schematic diagram of a structure of still yet another connector after a target insulating layer is formed according to an embodiment of the present disclosure.
Figure 11E:
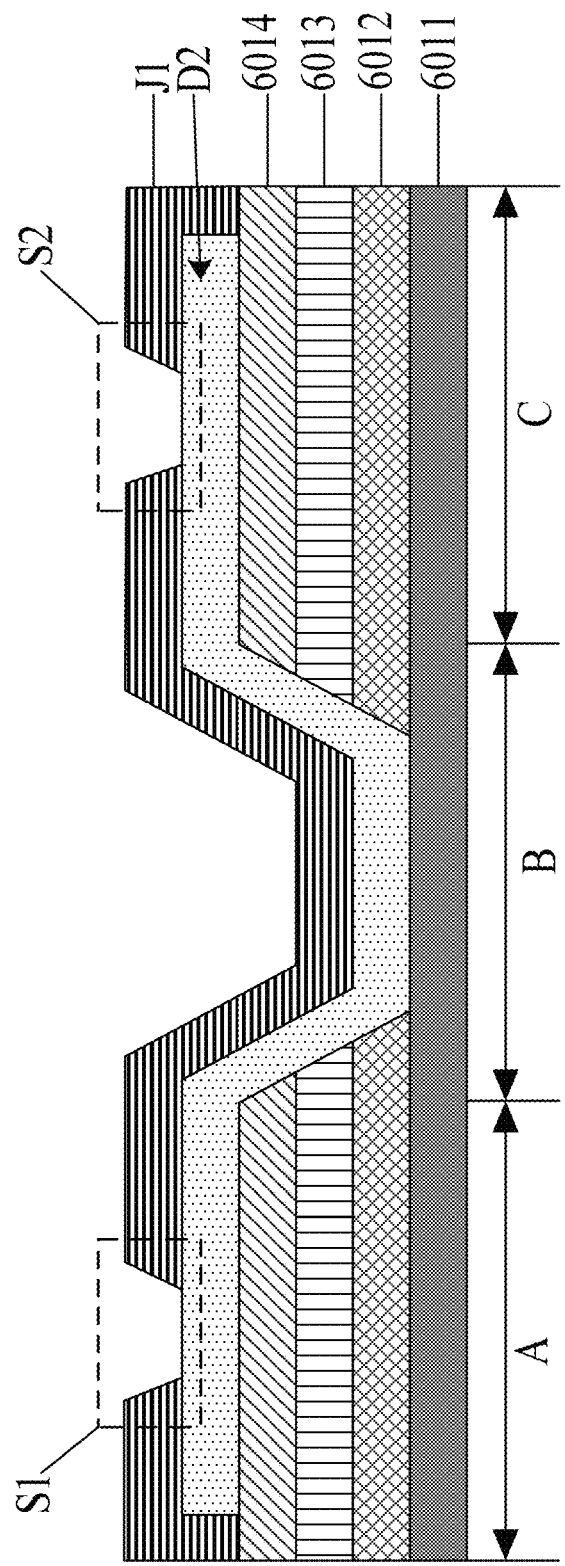
FIG. 11e is a schematic diagram of a structure of still yet another connector after via holes are formed on the target insulating layer according to another embodiment of the present disclosure.

As shown in FIG. 11b, in the course of manufacturing the connector, the PI substrate 6011, the water blocking layer 6012, the buffer layer 6013 and the auxiliary insulating layer 6014 may be sequentially formed on a bearing substrate (not shown in FIG. 11b). Then, the water blocking layer 6012, the buffer layer 6013 and the auxiliary insulating layer 6014 are etched, such that a groove is formed in the substrate (including the PI substrate 6011, the water blocking layer 6012, the buffer layer 6013 and the auxiliary insulating layer 6014). The substrate may be divided into a first edge region A, a target region B and a second edge region C, where the groove is located in the target region B. The PI base 6011 and the water blocking layer 6012 may be made into a single layer or multiple layers. Later, as shown FIG. 11c and FIG. 11d, the conductor layer D2 and the insulating layer J1 may continue to be sequentially formed on the auxiliary insulating layer 6014 and the groove. As shown in FIG. 11e, after the insulating layer J1 is formed, the insulating layer J1 may be etched, such that a plurality of via holes are formed in the insulating layer J1, and therefore, the conductor layer D2 at the plurality of via holes is exposed. It should be noted that only two (the via hole S1 and the via hole S2) of the plurality of via holes are shown in FIG. 11e. Then, as shown in FIG. 11a, a conductor layer D1 (i.e., the data conductor layer or the circuit conductor layer) may be formed on the insulating layer J1. The left end of the conductor layer D1 is connected to the data signal line in the display panel. The right end of the conductor layer D1 is connected to the driver IC. In addition, the conductor layer D1 is in contact and connection with the conductor layer D2 through the plurality of via holes. Finally, the bearing substrate may be stripped to obtain the connector as shown in FIG. 11a.

It should be noted that, in the sixth implementation manner and the seventh implementation manner of the connector, only one insulating layer is arranged between the two conductor layers in the connector, such that the processes may be reduced and the cost may be saved.

Exemplarily, the water blocking layer, the buffer layer, the auxiliary insulating layer and the target insulating layer in FIGS. 5a to 11e may be made of at least of the followings: silicon oxide (SiOx), silicon nitride (SiNx), silicon oxynitride (SiON), aluminum oxide (AlOx), zirconia (ZrOx) and the like. The conductor layer may be made of one of molybdenum (Mo), aluminum (Al), titanium (Ti), tungsten (W), copper (Cu), silver (Ag), graphene, carbon nanotubes and the like, or may be made of an alloy or composite material consisting of several of molybdenum (Mo), aluminum (Al), titanium (Ti), tungsten (W), copper (Cu), silver (Ag), graphene, carbon nanotubes and the like.

Figure 12:
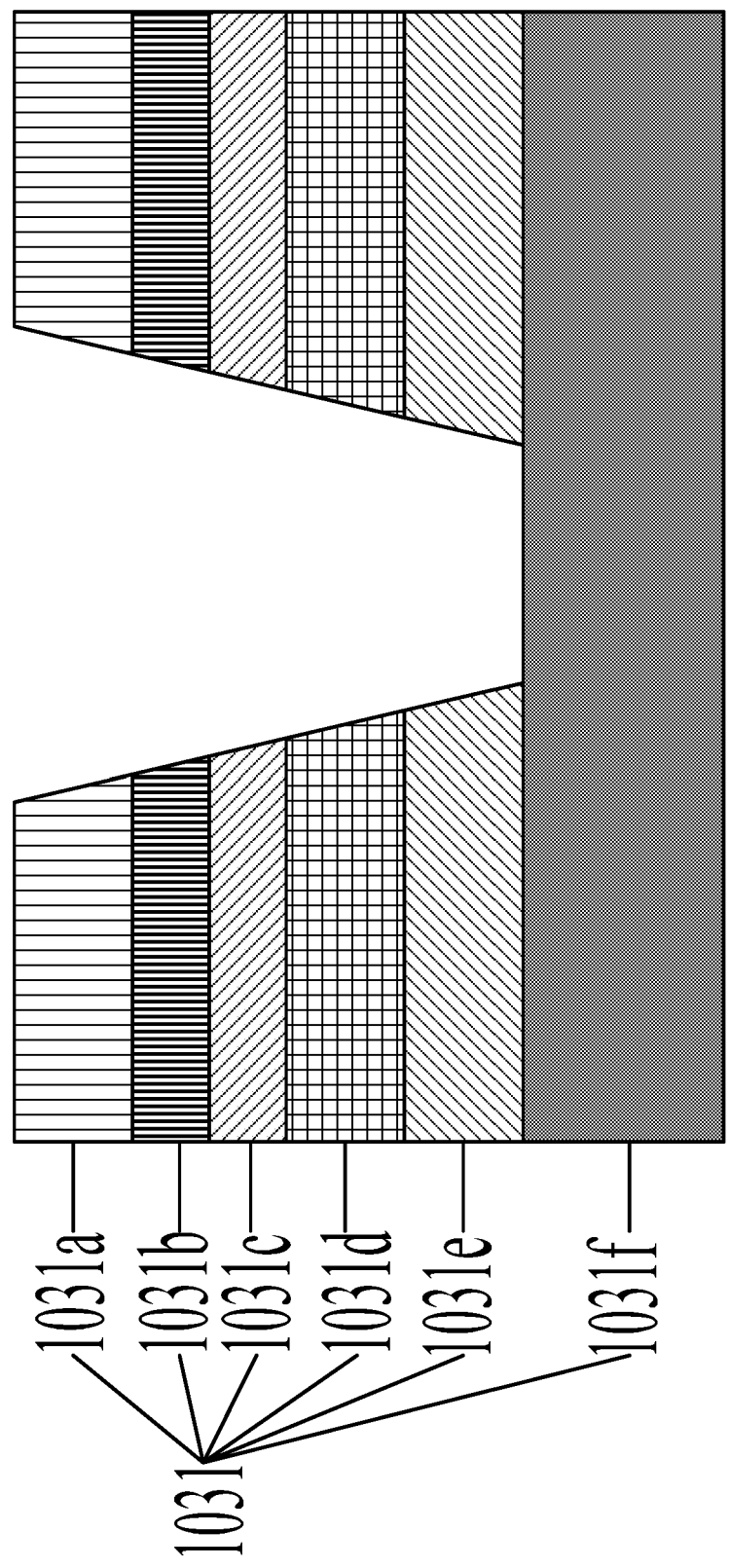
FIG. 12 is a schematic diagram of a structure of a base according to a prior art.
Figure 13:
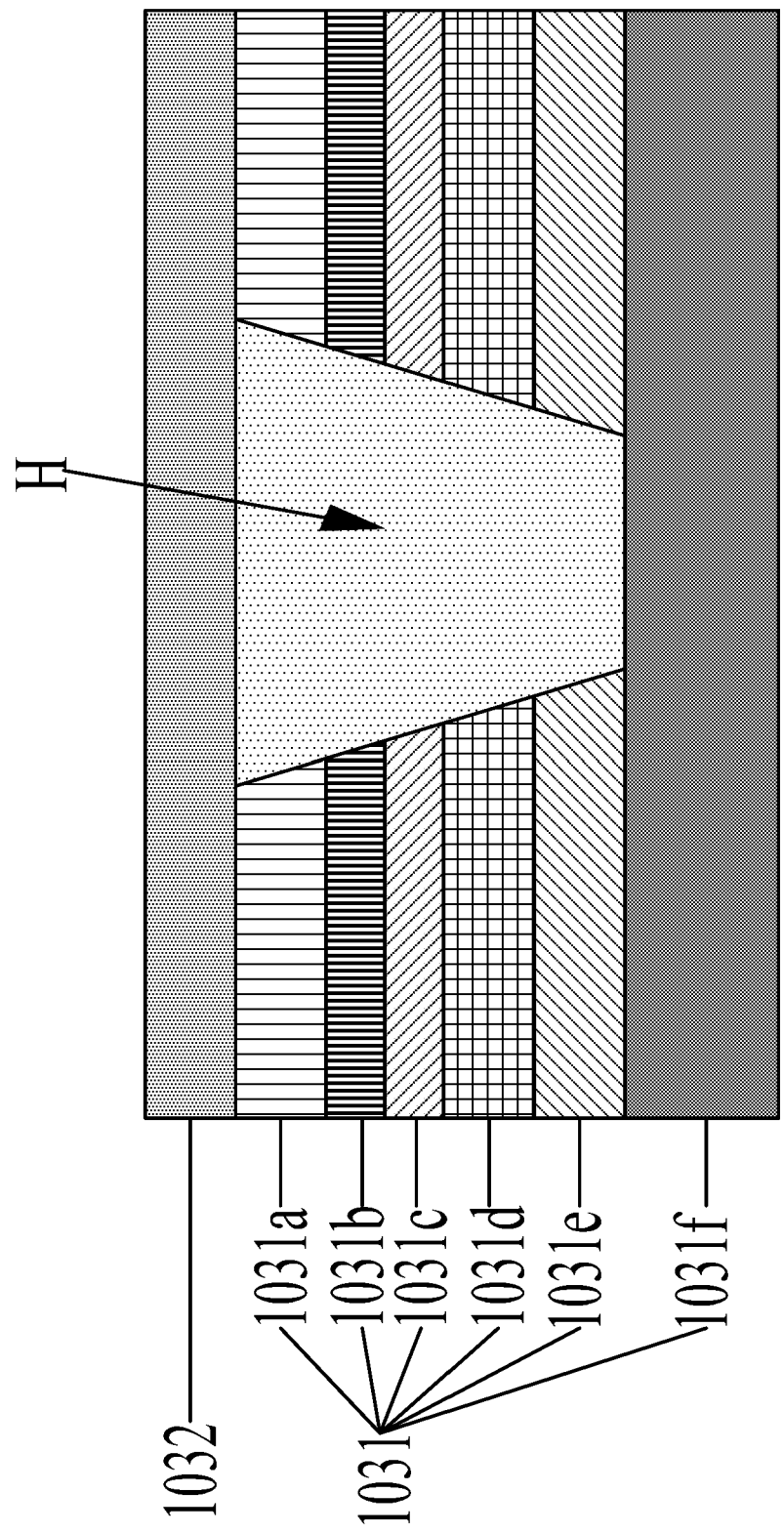
FIG. 13 is a schematic diagram of a structure of another connector according to a prior art.

As shown in FIG. 12, in order to solve the problem of the connector as shown in FIG. 3, before the conductor layer 1032 is manufactured, it is typically possible to etch a middle region of an inorganic material layer (including the water blocking layer 1031e, the buffer layer 1031d, the first gate insulating layer 1031c, the second gate insulating layer 1031b and the interlayer insulating layer 1031a) in the connector, such that etching holes are formed on the inorganic material layer. The middle portion is a region, which needs to be bent with a relatively great effort, in the inorganic material layer. Later, as shown in FIG. 13, the conductor layer 1032 may be formed after the etching holes are filled with a polymer H. That is, the inorganic material layer in the region which is bent with a relatively great effort is replaced with a polymer with small brittleness, thereby reducing the breakage probability of the substrate and further reducing the breakage risk of the conductor layer. However, in this solution, a step of etching the five-layer structure and a step of filling the polymer are added on the basis of the original process (FIG. 3), and the cost of the polymer is relatively high. Therefore, the cost of manufacturing the connector in this solution is relatively high.

However, an interlayer insulating layer is not included in the substrate of the connector provided in the embodiments of the present disclosure as shown in FIG. 4a, FIG. 4b, FIG. 5a, FIG. 6a, FIG. 7a, FIG. 8a, FIG. 9a, FIG. 10a, and FIG. 11a. Therefore, the substrate of the connector provided in the embodiments of the present disclosure is relatively thin, and the number of layers to be etched is relatively small, such that a groove is formed on the substrate at a relatively high speed. In addition, the connector provided in the embodiments of the present disclosure is not filled with a polymer, and therefore the cost of manufacturing the connector is relatively low.

Figure 14:
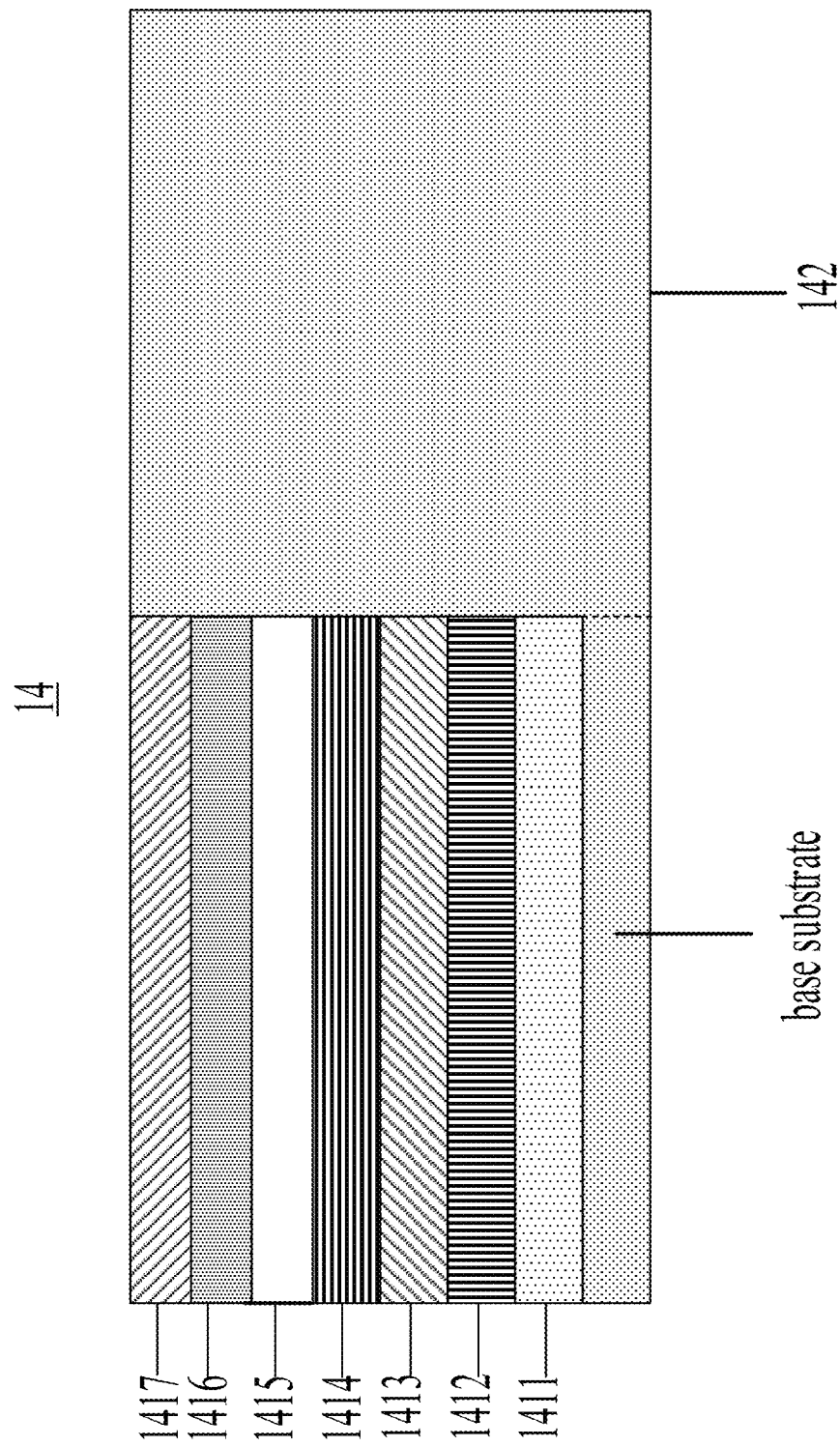
FIG. 14 is a schematic diagram of a structure of a display screen according to an embodiment of the present disclosure.

FIG. 14 is a schematic diagram of a structure of a display screen provided in an embodiment of the present disclosure. As shown in FIG. 14, the display screen 14 includes a display panel (not shown in FIG. 14), a driver IC (not shown in FIG. 14) and a connector 142 configured to connect the display panel and the driver IC. It should be noted that FIG. 14 illustrates the display screen when the connector 142 is not bent. When the connector 142 is bent, the driver IC is arranged on the non-display side of the display panel.

Exemplarily, the display panel may be a liquid crystal display panel or an OLED display panel. The display panel may include a substrate base (not shown in FIG. 14), and an active layer 1411, a first gate insulating layer 1412, a first gate signal line 1413, a second gate insulating layer 1414, a second gate signal line 1415, an interlayer dielectric layer 1416 and a data signal line 1417 which are arranged on the substrate base in sequence. The first gate insulating layer, the second gate insulating layer and the interlayer dielectric layer may be made of at least one of the followings: silicon oxide (SiOx), silicon nitride (SiNx), silicon oxynitride (SiON), aluminum oxide (AlOx), zirconia (ZrOx) and the like. The first gate signal line, the second gate signal line and the data signal line may be made of one of molybdenum (Mo), aluminum (Al), titanium (Ti), tungsten (W), copper (Cu), silver (Ag), graphene, carbon nanotubes and the like, or may be made of an alloy or composite material consisting of several of molybdenum (Mo), aluminum (Al), titanium (Ti), tungsten (W), copper (Cu), silver (Ag), graphene, carbon nanotubes and the like.

It should be noted that a part of the structure in the connector 142 may be integrated with a part of the structure in the display panel 101. Exemplarily, as shown in FIG. 14, a part of the structure in the connector 142 may be integrated with the substrate base in the display panel.

In addition, when the display screen is manufactured, the connector may be formed first by arranging, on a substrate, a conductor structure whose target surface away from the substrate is uneven. Then, one end of the conductor structure may be connected to the data signal line on the display panel, and the other end of the conductor structure may be connected to the driver IC. Finally, the connector can be bent, such that the driver IC is arranged on the non-display side of the display panel. Here, the display panel includes a substrate base, and an active layer, a first gate insulating layer, a first gate signal line, a second gate insulating layer, a second gate signal line, an interlayer dielectric layer and a data signal line which are arranged on the substrate base in sequence.

The display screen may be implemented in several manners based on different implementation manners of the connector. Here, only three of the implementation manners are illustrated as examples.

In the first implementation manner, referring to FIG. 14 and FIG. 5a, or referring to FIG. 14 and FIG. 6a, the auxiliary insulating layer 6014 in the connector may be formed of the same material layer as that of the first gate insulating layer 1412 in the display panel. The conductor layer D2 in the connector may be formed of the same material layer as that of the first gate signal line 1413 in the display panel. The insulating layer J2 in the connector may be formed of the same material layer as that of the second gate insulating layer 1414 in the display panel. The insulating layer J1 in the connector may be formed of the same material layer as that of the interlayer dielectric layer 1416 in the display panel. The conductor layer D1 in the connector may be formed of the same material layer as that of the data signal line 1417 in the display panel.

In the process of manufacturing the display screen, when two film layers formed of the same material layer in the display panel and the connector are manufactured, the same material layer may be formed first, and different regions of the same material layer are processed to obtain the two film layers in the display panel and the connector. Therefore, the steps of the manufacturing process are reduced, and the manufacturing time is saved.

Exemplarily, the PI substrate may be divided into a display region (a region where the display panel is to be arranged) and a non-display region. In the course of manufacturing the display screen, the PI substrate in the connector may be formed first. The active layer 1411 is formed on the display region (i.e., the substrate base in the display panel) of the PI substrate. A water blocking layer 6012 and a buffer layer 6013 are sequentially formed on the non-display region of the PI substrate. Later, a first gate insulating material layer is formed on the active layer 1411 and the buffer layer 6013 at the same time. The water blocking layer 6012, the buffer layer 6013 and the first gate insulating layer on the non-display region of the PI substrate are etched to obtain the substrate 601 in the connector. At this time, the first gate insulating material layer located in the display region is the first gate insulating layer 1412 in the display panel, and the first gate insulating material layer in the non-display region is the auxiliary insulating layer 6014 in the connector.

Later, after the substrate 601 in the connector is obtained, a conductor material layer may be formed on the substrate 601 and the first gate insulating layer 1412 at the same time. The conductor material layer is processed to obtain the first gate signal line 1413 in the display panel and the conductor layer D2 in the connector. Then, a second gate insulating material layer may be formed again on the first gate signal line 1413 and the conductor layer D2 at the same time. The second gate insulating material layer located in the display region is the second gate insulating layer 1414 in the display panel, and the second gate insulating material layer located in the non-display region is the first target insulating layer (i.e., the insulating layer J2) in the connector. Later, a second gate signal line 1415 is formed on the second gate insulating layer 1414, and then an interlayer dielectric material layer may be formed on the second gate signal line 1415 and the insulating layer J2 at the same time. The interlayer dielectric material layer located in the display region is the interlayer dielectric layer 1416 in the display panel, and the interlayer dielectric material layer located in the non-display area is the second target insulating layer (i.e., the insulating layer J1) of the connector.

Finally, the two target insulating layers in the connector are etched to obtain a plurality of via holes, such that the formed conductor layer D2 is exposed at the plurality of via holes. A data material layer is formed on the interlayer dielectric layer 1416 and the insulating layer J1 at the same time. The data material layer is processed to obtain the data signal line 1417 in the display panel and the conductor layer D1 in the connector. In addition, the conductor layer D1 is in contact and connection with the conductor layer D2 through the plurality of via holes.

In the second implementation manner, referring to FIG. 14 and FIG. 7a, or referring to FIG. 14 and FIG. 8a, or referring to FIG. 14 and FIG. 9a, the auxiliary insulating layer 6014 in the connector may be formed of the same material layer as that of the first gate insulating layer 1412 in the display panel. The conductor layer D3 in the connector may be formed of the same material layer as that of the first gate signal line 1413 in the display panel. The insulating layer J2 in the connector may be formed of the same material layer as that of the second gate insulating layer 1414 in the display panel. The conductor layer D2 in the connector may be formed of the same material layer as that of the second gate signal line 1415 in the display panel. The insulating layer J1 in the connector may be formed of the same material layer as that of the interlayer dielectric layer 1416 in the display panel. The conductor layer D1 in the connector may be formed of the same material layer as that of the data signal line 1417 in the display panel.

In the course of manufacturing the display screen, the PI substrate in the connector may be formed first. The active layer 1411 is formed on the display region of the PI substrate. A water blocking layer 6012 and a buffer layer 6013 are sequentially formed on the non-display region of the PI substrate. Later, a first gate insulating material layer is formed on the active layer 1411 and the buffer layer 6013 at the same time. The water blocking layer 6012, the buffer layer 6013 and the first gate insulating layer which are located on the non-display region on the PI substrate are etched to obtain the substrate 601 in the connector. At this time, the first gate insulating material layer located in the display region is the first gate insulating layer 1412 in the display panel, and the first gate insulating material layer located in the non-display region is the auxiliary insulating layer 6014 in the connector.

Later, after the substrate 601 in the connector is obtained, a first conductor material layer may be formed on the substrate 601 and the first gate insulating layer 1412 at the same time. The first conductor material layer is processed to obtain a first gate signal line 1413 in the display panel and the conductor layer D3 in the connector. Then, a second gate insulating material layer may be formed again on the gate signal line 1413 and the conductor layer D2 at the same time. The second gate insulating material layer located in the display region is the second gate insulating layer 1414 in the display panel, and the second gate insulating material layer located in the non-display region is the first target insulating layer (i.e., the insulating layer J2) in the connector. Next, the insulating layer J2 is etched to obtain a plurality of first via holes, such that the conductor layer D3 is exposed at the plurality of first via holes. Thereafter, a second conductor material layer may be formed on the second gate insulating layer 1414 and the insulating layer J2 at the same time. The second conductor material layer is processed to obtain the second gate signal line 1415 in the display panel and the conductor layer D2 in the connector. In addition, the conductor layer D2 is in contact and connection with the conductor layer D3 through the plurality of first via holes. Then, an interlayer dielectric material layer is formed on the second gate signal line 1415 and the conductor layer D2 at the same time. The interlayer dielectric material layer located in the display region is the interlayer dielectric layer 1416 in the display panel. The interlayer dielectric material layer located in the non-display region is the second target insulating layer (i.e., the insulating layer J1) of the connector.

Finally, the insulating layer J1 is etched to obtain a plurality of second via holes, such that the formed conductor layer D2 is exposed at the plurality of second via holes. A data material layer is formed on the interlayer dielectric layer 1416 and the insulating layer J1 at the same time. The data material layer is processed to obtain the data signal line 1416 in the display panel and the conductor layer D1 in the connector. In addition, the conductor layer D1 is contact and connection with the conductor layer D2 through the plurality of second via holes.

In the third implementation manner, referring to FIG. 14 and FIG. 10a, or referring to FIG. 14 and FIG. 11a, the auxiliary insulating layer 6014 in the connector may be divided into two layers: a first auxiliary layer and a second auxiliary layer. The first auxiliary layer may be a layer, away from the conductor layer, of the two auxiliary layers. The second auxiliary layer may be a layer, close to the conductor layer, of the two auxiliary layers. The first auxiliary layer is formed of the same material layer as that of the first gate insulating layer 1412 in the display panel. The second auxiliary layer is formed of the same material layer as that of the second gate insulating layer 1414 in the display panel. The conductor layer D2 in the connector may be formed of the same material layer as that of the second gate signal line 1415 in the display panel. The insulating layer J1 in the connector may be formed of the same material layer as that of the interlayer dielectric layer 1416 in the display panel. The conductor layer D1 in the connector may be formed of the same material layer as that of the data signal line 1417 in the display panel.

In the course of manufacturing the display screen, the PI substrate in the connector may be formed first. The active layer 1411 is formed on the display region of the PI substrate. A water blocking layer 6012 and a buffer layer 6013 are sequentially formed on the non-display region of the PI substrate. Later, a first gate insulating material layer may be formed on the active layer 1411 and the buffer layer 6013 at the same time. At this time, the first gate insulating material layer located in the display region is the first gate insulating layer 1412 in the display panel, and the first gate insulating material layer located in the non-display region is the first auxiliary layer in the auxiliary insulating layer 6014 in the connector. Next, a first gate signal line 1413 may be formed on the first gate insulating layer 1412. In addition, a second gate insulating material layer is formed on the first gate signal line 1413 and the first auxiliary layer at the same time. A second gate insulating material layer located in the display area is the second gate insulating layer 1414. The second gate insulating material layer located in the non-display region is the second auxiliary layer in the auxiliary insulating layer 6014. Thereafter, the water blocking layer 6012, the buffer layer 6013, the first auxiliary layer and the second auxiliary layer which are located on the non-display region of the PI substrate may be etched to obtain the substrate 601 in the connector.

Later, after the substrate 601 in the connector is obtained, a conductor material layer may be formed on the substrate 601 and the second gate insulating layer 1414 at the same time. The conductor material layer is processed to obtain the second gate signal line 1415 in the display panel and the conductor layer D2 in the connector. Then, an interlayer dielectric material layer is formed on the second gate signal line 1415 and the conductor layer D2 at the same time. The interlayer dielectric material layer located in the display region is the interlayer dielectric layer 1416 in the display panel. The interlayer dielectric material layer located in the non-display region is the target insulating layer (i.e., the insulating layer J1) of the connector.

Finally, the insulating layer J1 is etched to obtain a plurality of via holes, such that the formed conductor layer D2 is exposed at the plurality of via holes. A data material layer is formed on the interlayer dielectric layer 1416 and the insulating layer J1 at the same time. The data material layer is processed to obtain the data signal line 1417 in the display panel and the conductor layer D1 in the connector. In addition, the conductor layer D1 is contact and connection with the conductor layer D2 through the plurality of via holes.

From the above, the target surface of the conductor structure in the connector provided in the embodiments of the present disclosure is uneven, which is conductive to releasing the stress acting on the conductor structure when the substrate is bent. Therefore, the conductor structure is less affected by this stress, thereby reducing the probability of the conductor structure breaking under the stress of the substrate. Further, the case that the driver IC and the data signal line cannot be effectively connected due to the breakage of the conductor structure is prevented, and the display screen has a good display effect.

Additionally, there are used in the connector a plurality of conductor layers connected with each other. The data conductor layers in the plurality of conductor layers are connected to the data signal lines on the display panel. The circuit conductor layers in the plurality of conductor layers are connected to the driver IC arranged on the non-display side of the display panel. The driver IC may send control signals to the display panel through the plurality of conductor layers. When the connector is bent, even if one conductor layer is broken, the driver IC may also continue to be effectively connected to the data signal line through other conductor layers, such that the display screen may continue to have a good display effect.

The above embodiments of the display screen and the embodiments of the connector may be made reference to each other, which is not limited in the embodiments of the present disclosure. The foregoing descriptions are merely exemplary embodiments of the present disclosure, and are not intended to limit the present disclosure. Within the spirit and principles of the disclosure, any modifications, equivalent substitutions, improvements, etc., are within the protection scope of appended claims of the present disclosure.

What is claimed is:

1. A display screen, comprising: a display panel, a driver IC and a connector, wherein the driver IC is arranged on a non-display side of the display panel, and the connector is configured to connect the display panel and the driver IC; and the connector comprises a substrate on which a conductor structure is arranged, one end of the conductor structure is connected to a data signal line on the display panel, the other end of the conductor structure is connected to the driver IC arranged on the non-display side of the display panel, and a target surface, away from the substrate, of the conductor structure is uneven, wherein the display panel comprises: a substrate base, and an active layer, a first gate insulating layer, a first gate signal line, a second gate insulating layer, a second gate signal line, an interlayer dielectric layer and a data signal line which are arranged on the substrate base in sequence;

the connector comprises a substrate on which two conductor layers and two target insulating layers are arranged, the two target insulating layers being stacked between the two conductor layers;

wherein the first conductor layer close to the substrate is formed of the same material layer as that of the first gate signal line; the first target insulating layer close to the substrate is formed of the same material layer as that of the second gate insulating layer; the second target insulating layer close to the substrate is formed of the same material layer as that of the interlayer dielectric layer; the second conductor layer close to the substrate is formed of the same material layer as that of the data signal line; and the second conductor layer close to the substrate is connected to the data signal line, and any one of the two conductor layers is connected to the driver IC.

2. The display screen according to claim 1, wherein the substrate comprises: a PI substrate, and a water-blocking layer, a buffer layer and an auxiliary insulating layer which are arranged on the PI substrate in sequence, wherein the m conductor layers are arranged on the auxiliary insulating layer, and the auxiliary insulating layer is formed of the same material layer as that of the first gate insulating layer.

3. The display screen according to claim 1, wherein the display panel comprises a substrate base, and an active layer, a first gate insulating layer, a first gate signal line, a second gate insulating layer, a second gate signal line, an interlayer dielectric layer and a data signal line which are arranged on the substrate base in sequence;

the connector comprises a substrate on which three conductor layers and two target insulating layers are arranged, the conductor layers and the target insulating layers being alternately arranged;

wherein the first conductor layer close to the substrate is formed of the same material layer as that of the first gate signal line; the first target insulating layer close to the substrate is formed of the same material layer as that of the second gate insulating layer; the second conductor layer close to the substrate is formed of the same material layer as that of the second gate signal line; the second target insulating layer close to the substrate is formed of the same material layer as that of the interlayer dielectric layer; the third conductor layer close to the substrate is formed of the same material layer as that of the data signal line; and the third conductor layer close to the substrate is connected to the data signal line, and any one of the third conductor layers is connected to the driver IC.

4. The display screen according to claim 3, wherein the substrate comprises: a PI substrate, and a water-blocking layer, a buffer layer and an auxiliary insulating layer which are arranged on the PI substrate in sequence, wherein the m conductor layers are arranged on the auxiliary insulating layer, and the auxiliary insulating layer is formed of the same material layer as that of the first gate insulating layer.

5. The display screen according to claim 1, wherein the display panel comprises a substrate base, and an active layer, a first gate insulating layer, a first gate signal line, a second gate insulating layer, a second gate signal line, an interlayer dielectric layer and a data signal line which are arranged on the substrate base in sequence;

the connector comprises a substrate on which two conductor layers and one target insulating layer are arranged, the target insulating layer being arranged between the two conductor layers;

wherein the first conductor layer close to the substrate is formed of the same material layer as that of the second gate signal line; the target insulating layer is formed of the same material layer as that of the interlayer dielectric layer; the second conductor layer close to the substrate is formed of the same material layer as that of the data signal line; and the second conductor layer close to the substrate is connected to the data signal line, and any one of the two conductor layers is connected to the driver IC.

6. The display screen according to claim 5, wherein the substrate comprises: a PI substrate, and a water-blocking layer, a buffer layer and two auxiliary insulating layers which are all arranged on the PI substrate in sequence, wherein the m conductor layers are arranged on the two auxiliary insulating layers, and the auxiliary insulating layer, close to the buffer layer, of the two auxiliary insulating layers is formed of the same material layer as that of the first gate insulating layer; the auxiliary insulating layer, away from the buffer layer, of the two auxiliary insulating layers is formed of the same material layer as that of the second gate insulating layer.

7. The display screen according to claim 1, wherein the substrate comprises a target region, and a first edge region and a second edge region, which are located on two sides of the target region respectively, and a portion, located on the target region, in the target surface is uneven, and portions, located on the first edge region and the second edge region, in the target region are even.

8. The display screen according to claim 7, wherein at least one of the target insulating layers is arranged between every two adjacent conductor layers in the m conductor layers.

9. The display screen according to claim 1, wherein the substrate comprises a target region, and a first edge region and a second edge region which are located on two sides of the target region respectively, wherein portions, located on the target region, the first edge region and the second edge region, in the target surface are uneven.

10. The display screen according to claim 9, wherein the target region of the substrate is provided with a groove whose opening faces the conductor structure.

11. The display screen according to claim 1, wherein the conductor structure comprises m conductive layers arranged on the substrate on which n target insulating layers are also arranged, where m≥2, n≥1;

the m conductive layers comprise a data conductor layer and a circuit conductor layer, wherein the data conductor layer is connected to the data signal line, and the circuit conductor layer is connected to the driver IC; and the n target insulating layers are located among the m conductor layers, and the m conductor layers are connected through via holes in the n target insulating layers.

12. A method for manufacturing a display screen, comprising the following steps:

forming a connector by arranging, on a substrate, a conductor structure whose target surface away from the substrate is uneven;

connecting one end of the conductor structure to a data signal line on a display panel;

connecting the other end of the conductor structure to a driver IC; and bending the connector to arrange the driver IC on a non-display side of the display panel, wherein the display panel comprises: a substrate base, and an active layer, a first gate insulating layer, a first gate signal line, a second gate insulating layer, a second gate signal line, an interlayer dielectric layer and a data signal line which are arranged on the substrate base in sequence, wherein the forming of the connector by arranging, on the substrate, the conductor structure whose target surface away from the substrate is uneven comprises: forming two conductor layers and two target insulating layers on the substrate, the two target insulating layers being stacked between the two conductor layers, wherein the first conductor layer close to the substrate is formed of the same material layer as that of the first gate signal line; the first target insulating layer close to the substrate is formed of the same material layer as that of the second gate insulating layer; the second target insulating layer close to the substrate is formed of the same material layer as that of the interlayer dielectric layer; the second conductor layer close to the substrate is formed of the same material layer as that of the data signal line;

the step of connecting one end of the conductor structure to the data signal line on the display panel comprises: connecting the second conductor layer close to the substrate to the data signal line;

the step of connecting the other end of the conductor structure to the driver IC comprises: connecting any one of the two conductor layers to the driver IC.

13. The method according to claim 12, wherein the display panel comprises: a substrate base, and an active layer, a first gate insulating layer, a first gate signal line, a second gate insulating layer, a second gate signal line, an interlayer dielectric layer and a data signal line which are arranged on the substrate base in sequence;

the step of forming the connector by arranging, on the substrate, the conductor structure whose target surface away from the substrate is uneven comprises: forming three conductor layers and two target insulating layers on the substrate, the conductor layers and the target insulating layers are arranged alternately, wherein the first conductor layer close to the substrate is formed of the same material layer as that of the first gate signal line; the first target insulating layer close to the substrate is formed of the same material layer as that of the second gate insulating layer; the second conductor layer close to the substrate is formed of the same material layer as that of the second gate signal line; the second target insulating layer close to the substrate is formed of the same material layer as that of the interlayer dielectric layer; the third conductor layer close to the substrate is formed of the same material layer as that of the data signal line;

the step of connecting one end of the conductor structure to the data signal line on the display panel comprises: connecting the third conductor layer close to the substrate to the data signal line; and the step of connecting the other end of the conductor structure to the driver IC comprises: connecting any one of the third conductor layers to the driver IC.

* * * * *